(12) United States Patent
Nakamura et al.

(10) Patent No.: US 8,454,173 B2
(45) Date of Patent: Jun. 4, 2013

(54) IMAGE FORMING APPARATUS

(75) Inventors: Makiko Nakamura, Chino (JP); Akihiro Murata, Hokuto (JP); Yasushi Mizoguchi, Suwa (JP); Takuya Nakajima, Nerima (JP)

(73) Assignee: Seiko Epson Corporation (JP)

( * ) Notice: Subject to any disclaimer, the term of this patent is extended or adjusted under 35 U.S.C. 154(b) by 289 days.

(21) Appl. No.: 12/907,428

(22) Filed: Oct. 19, 2010

(65) Prior Publication Data

US 2011/0116055 A1 May 19, 2011

(30) Foreign Application Priority Data

Nov. 18, 2009 (JP) ................................. 2009-263406
Apr. 20, 2010 (JP) ................................. 2010-097166

(51) Int. Cl.
*G03B 21/14* (2006.01)
(52) U.S. Cl.
USPC ................................. 353/94; 345/1.3; 353/121
(58) Field of Classification Search
USPC .................... 353/30, 79, 94, 28; 345/1.3, 2.1, 345/2.2
See application file for complete search history.

(56) References Cited

U.S. PATENT DOCUMENTS

| 5,988,817 | A  | * | 11/1999 | Mizushima et al. | 353/94 |
| 6,431,711 | B1 | * | 8/2002  | Pinhanez         | 353/69 |
| 7,033,028 | B1 | * | 4/2006  | Belliveau        | 353/31 |
| 2002/0063854 | A1 | * | 5/2002  | Flint         | 353/94 |
| 2008/0036971 | A1 | * | 2/2008  | Hasegawa      | 353/30 |
| 2008/0297740 | A1 | * | 12/2008 | Huynh et al.  | 353/94 |
| 2009/0303447 | A1 | * | 12/2009 | Turner et al. | 353/51 |
| 2010/0309391 | A1 | * | 12/2010 | Plut           | 348/756 |
| 2011/0157486 | A1 | * | 6/2011  | Murata et al.  | 348/744 |
| 2011/0205497 | A1 | * | 8/2011  | Wakabayashi et al. | 353/28 |

FOREIGN PATENT DOCUMENTS

JP 2008-116668 5/2008

* cited by examiner

*Primary Examiner* — William C Dowling
(74) *Attorney, Agent, or Firm* — Harness, Dickey & Pierce, P.L.C.

(57) ABSTRACT

An image forming apparatus includes: a first projector that scans light on a first display section to thereby display an image; a second projector that scans the light on a second display section, which is set in a position different from a position of the first display section, to thereby display an image; and a switching section that switches plural states including a first state in which the first projector displays the image on the first display section and a second state in which the second projector displays an image on the second display section.

7 Claims, 29 Drawing Sheets

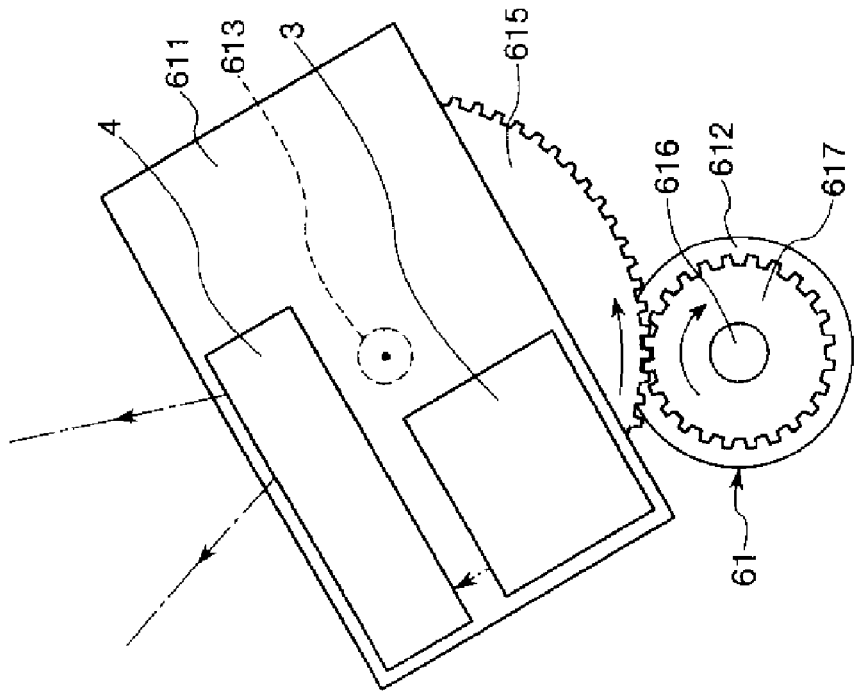
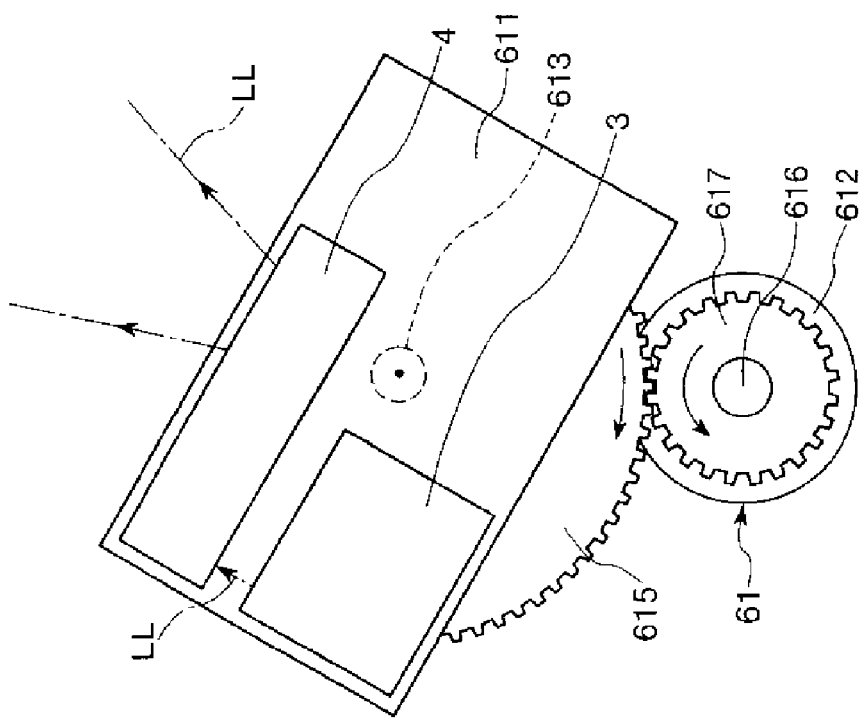

IMAGE FORMING APPARATUS

BACKGROUND

1. Technical Field

The present invention relates to an image forming apparatus.

2. Related Art

A projector is known as an apparatus that projects light on the surface of an object such as a screen and displays a desired image on a projection surface of the screen. As such a projector, a projector including an optical scanner that one-dimensionally or two-dimensionally scans light is put to practical use (see, for example, JP-A-2008-116668).

The projector disclosed in JP-A-2008-116668 includes a first optical scanner in which a movable plate having a light reflecting section pivots around an x axis, a second optical scanner in which a movable plate having a light reflecting section pivots around a y axis orthogonal to the x axis, and a light source device that emits light such as a laser. The projector scans the light emitted from the light source device with the first optical scanner and further scans the scanned light with the second optical scanner to thereby two-dimensionally scan the light and display a desired image on the screen.

In recent years, it is proposed to set a screen in, for example, a station yard or a lobby of a building or a hotel crowded with people and display a desired image (a promotion video or a video of a commercial film or the like) on the screen using the projector to thereby advertise products targeting people around the screen.

However, in the projector disclosed in JP-A-2008-116668, since a display target of an image is only one screen set in advance, it is difficult to for people to recognize the presence of the image. When the screen is small, it is particularly difficult for people to recognize the presence of the image. If the presence of the image is not recognized, it is impossible to cause people to recognize content of the image. Therefore, it is impossible to obtain, for example, the effect of the advertisement (solicitation effect).

An increase in size of the screen does not always make it easier for people to recognize the presence of the image. In some case, the increase in size of the screen is difficult because of limitation in a setting space for the screen.

For example, to achieve an excellent effect of the advertisement, there is a demand for further improvement of expression power by the image.

SUMMARY

An advantage of some aspect of the invention is to provide an image forming apparatus that causes, even if a displayed image is small, people to easily recognize the presence of the image and can improve expression power of the image.

According to an aspect of the invention, there is provided an image forming apparatus including: a first projector that scans light on a first display section to thereby display an image; a second projector that scans the light on a second display section, which is set in a position different from the position of the first display section, to thereby display an image; and a switching section that switches plural states including a first state in which the first projector displays the image on the first display section and a second state in which the second projector displays an image on the second display section.

This makes it possible to cause, by changing a position where an image is displayed, people present around the image forming apparatus to easily recognize the presence of the image even if an area of a section in which the image is displayed is relatively small.

It is possible to improve expression power by the image by changing the position where the image is displayed.

In particular, in the aspect of the invention, since plural images in different positions are displayed by using the separate projectors, variations of positions where the images are displayed can be increased. Therefore, it is possible to make the effect more conspicuous.

Consequently, the image forming apparatus according to the aspect causes, even if a displayed image is small, people to easily recognize the present of the image and can improve expression power of the image.

Since the image forming apparatus according to the aspect displays an image using the projectors, the image forming apparatus is inexpensive and is easily set compared with an image forming apparatus including a flat panel display such as an LED panel, a liquid crystal panel, or an organic EL panel.

In the image forming apparatus according to the aspect, each of the first projector and the second projector may include: a light emitting section that emits a laser beam; and a light scanning section including an optical scanner in which a movable plate including a light reflecting section for reflecting the laser beam emitted from the light emitting section is pivotably provided, the optical scanner scanning the light reflected by the light reflecting section according to the pivoting.

This makes the configuration of the first projector and the second projector relatively simple and inexpensive. Since the laser beam is used, the projectors are focus-free and can perform near projection and adjust a projection position to an arbitrary position without being limited by a setting position. If the laser beam is used, an optical system such as a lens for converting the laser beam into parallel rays can be omitted or simplified. Therefore, it is possible to realize a reduction in size of the image forming apparatus.

The image forming apparatus according to the aspect may further include a moving object detection sensor that detects whether a moving object is present in each of a first detection region and a second detection region set in a position different from the position of the first detection region. The switching section may switch the first state and the second state on the basis of a detection result of the moving object detection sensor.

This makes it possible to switch a display position of an image according to the movement of a person (a moving object). As a result, it is possible to cause people to more easily recognize the presence of the image.

In the image forming apparatus according to the aspect, the switching section may switch the image forming apparatus to the first state when the moving object detection sensor detects the presence of a moving object in the first detection region and switch the image forming apparatus to the second state when the moving object detection sensor detects the presence of a moving object in the second detection region.

This makes it easy to cause a person (a moving object) present in the first detection region to recognize the presence of an image on the first display section and makes it easy to cause a person (a moving object) present in the second detection region to recognize the presence of an image on the second display section.

In the image forming apparatus according to the aspect, the switching section may switch plural states including a third state in which the first projector displays an image on the first display section and the second projector displays an image on the second display section.

This makes it possible to improve expression power by the image.

The image forming apparatus according to the aspect may further includes a third projector that scans light on a third display section, which is set in a position different from the positions of the first display section and the second display section, to thereby display an image. The switching section may switch plural states including a state in which the third projector displays an image in the third display section.

This makes it possible to improve expression power by the image.

According to another aspect of the invention, there is provided an image forming apparatus including: a projector that scans light to thereby display an image; and a switching section that switches plural states including a first state in which the projector displays an image on a first display section and a second state in which the projector displays an image on a second display section set in a position different from the position of the first display section.

This makes it easy to cause, even if a displayed image is small, a person to recognize the presence of the image and makes it possible to improve expression power by the image.

In the image forming apparatus according to the aspect, the projector may include a light emitting section that emits a laser beam. The projector scans the laser beam emitted from the light emitting section to thereby display an image.

Since the laser beam is used, the projector is focus-free and can perform near projection and adjust a projection position to an arbitrary position without being limited by a setting position. If the laser beam is used, an optical system such as a lens for converting the laser beam into parallel rays can be omitted or simplified. Therefore, it is possible to realize a reduction in size of the image forming apparatus as well as a reduction in size of the light emitting section.

BRIEF DESCRIPTION OF THE DRAWINGS

The invention will be described with reference to the accompanying drawings, wherein like numbers reference like elements.

FIGS. 12A to 12C are top views for explaining switching of a display position of an image in the image forming apparatus shown in FIG. 1, wherein FIG. 12A is a diagram showing a first state, FIG. 12B is a diagram showing a second state and FIG. 12C is a diagram showing a third state.

FIGS. 28A and 28B are top views for explaining an action of the unit pivoting mechanism shown in FIG. 27.

DESCRIPTION OF EXEMPLARY EMBODIMENTS

Exemplary embodiments of an image forming apparatus according to the invention are explained below with reference to the accompanying drawings.

First Embodiment

Figure 1:
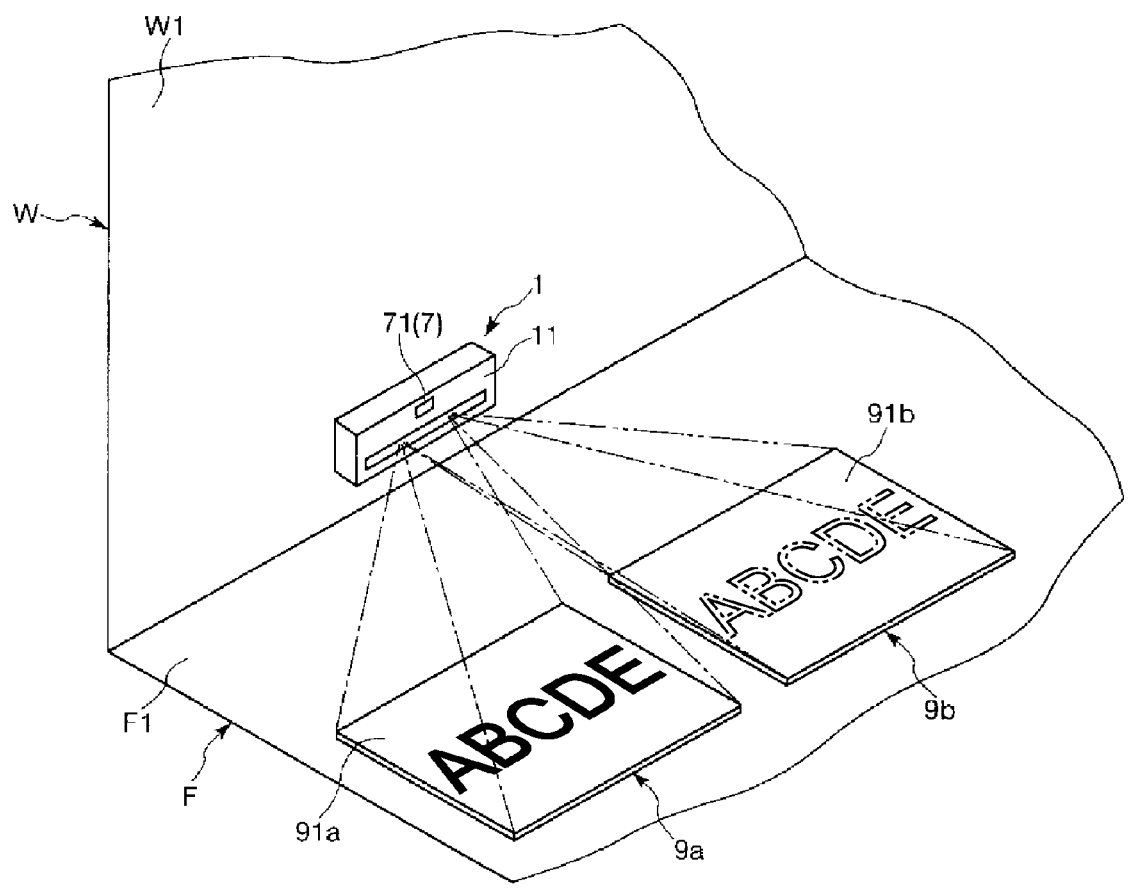
FIG. 1 is a diagram showing a first embodiment of an image forming apparatus according to the invention.
Figure 2:
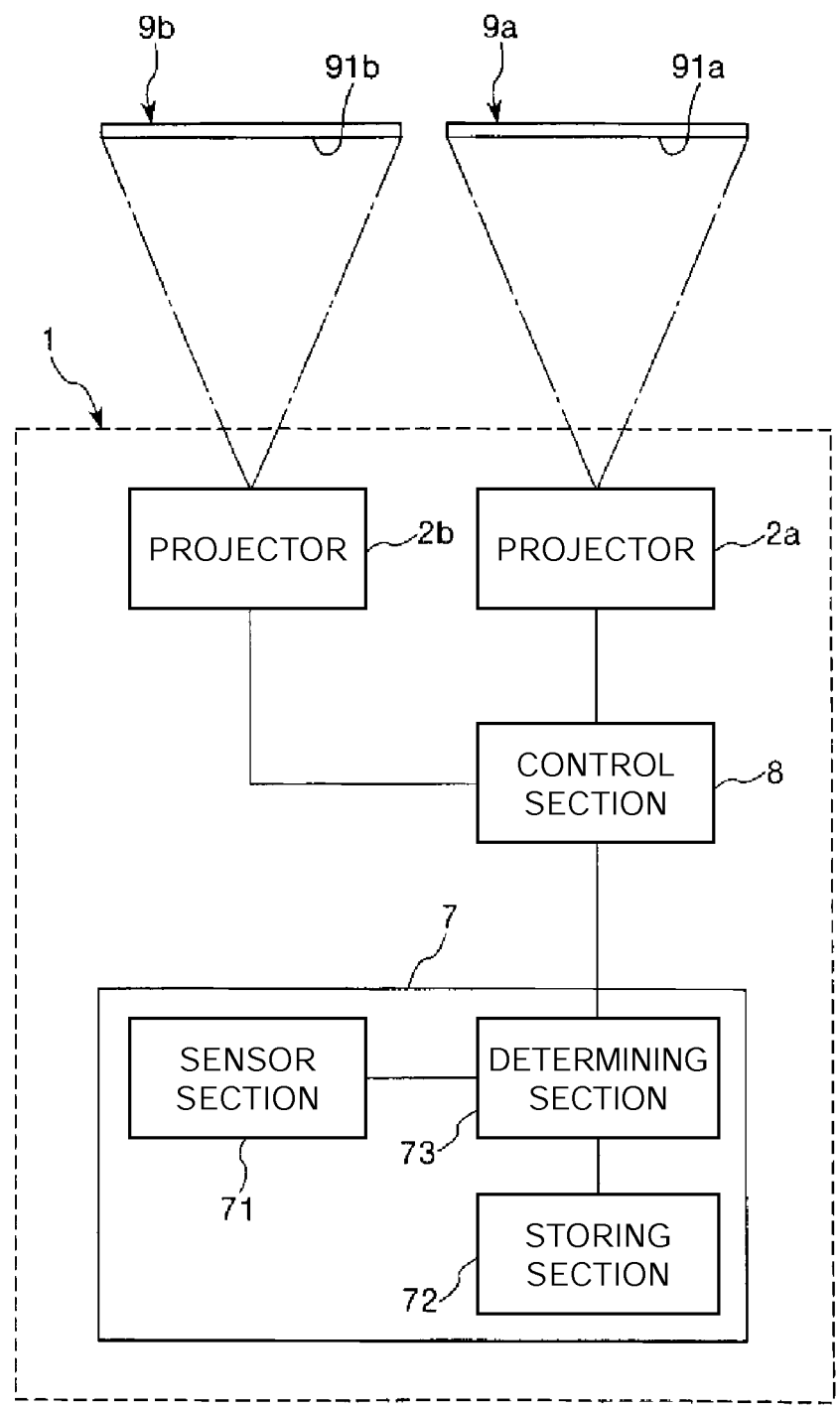
FIG. 2 is a block diagram showing a schematic configuration of the image forming apparatus shown in FIG. 1.
Figure 3:
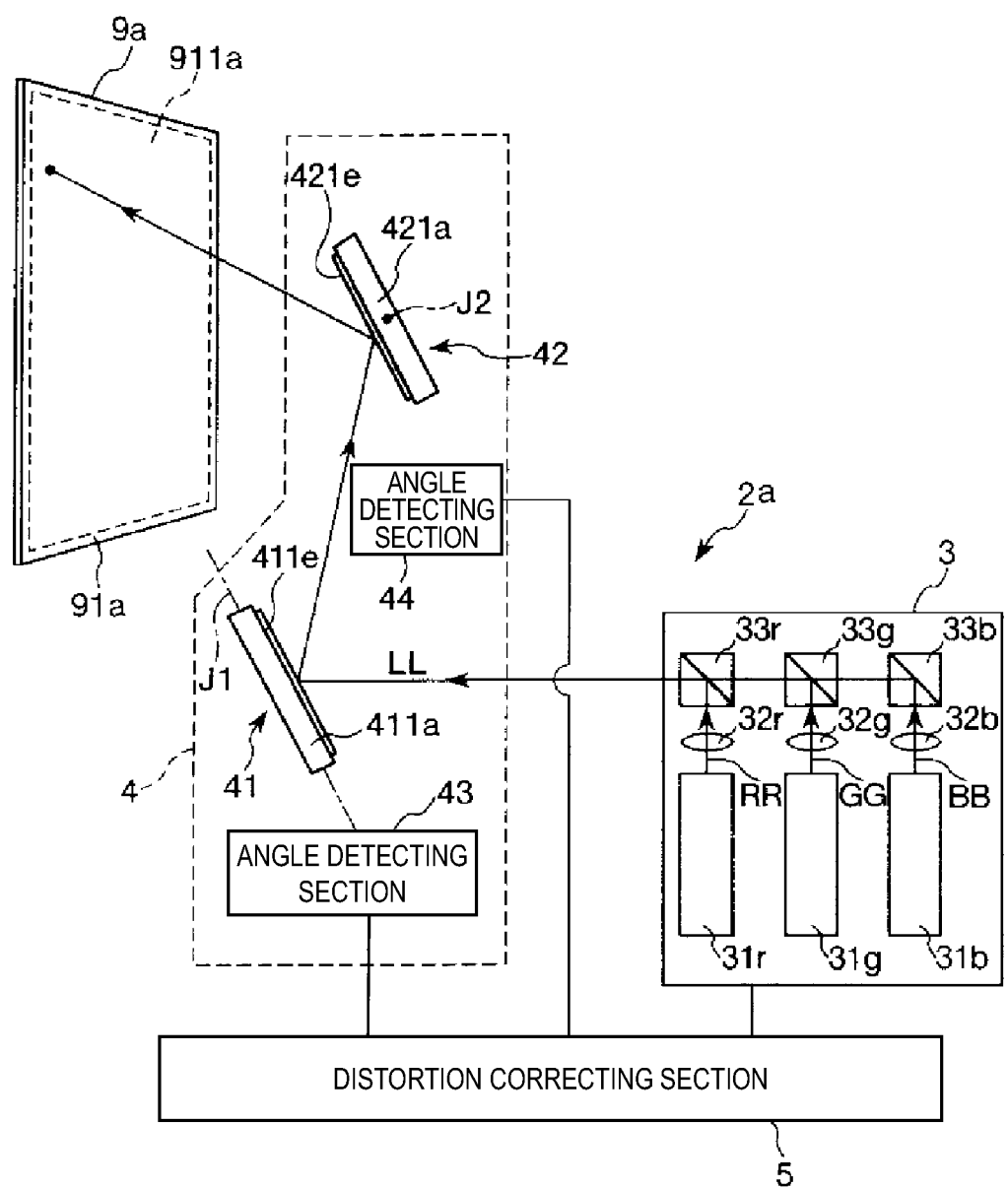
FIG. 3 is a diagram showing a schematic configuration of a projector included in the image forming apparatus shown in FIG. 2.
Figure 4:
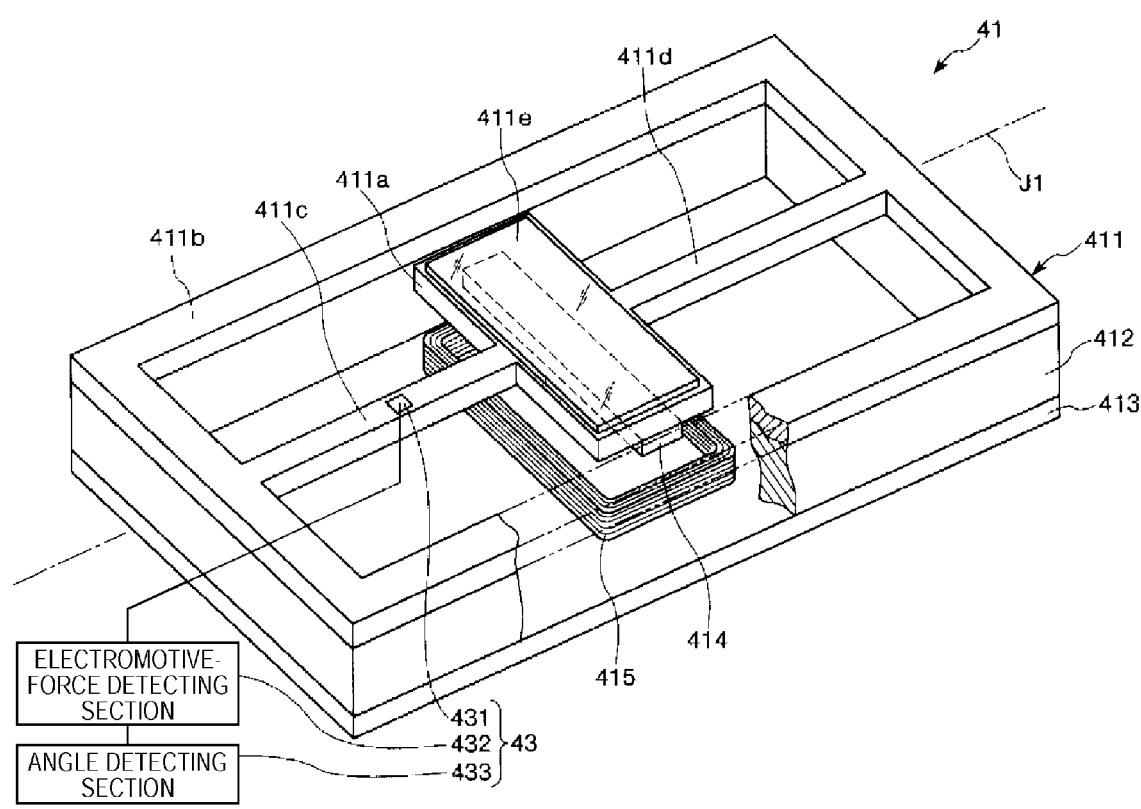
FIG. 4 is a partial sectional perspective view of optical scanners included in the projector shown in FIG. 3.
Figure 5A:
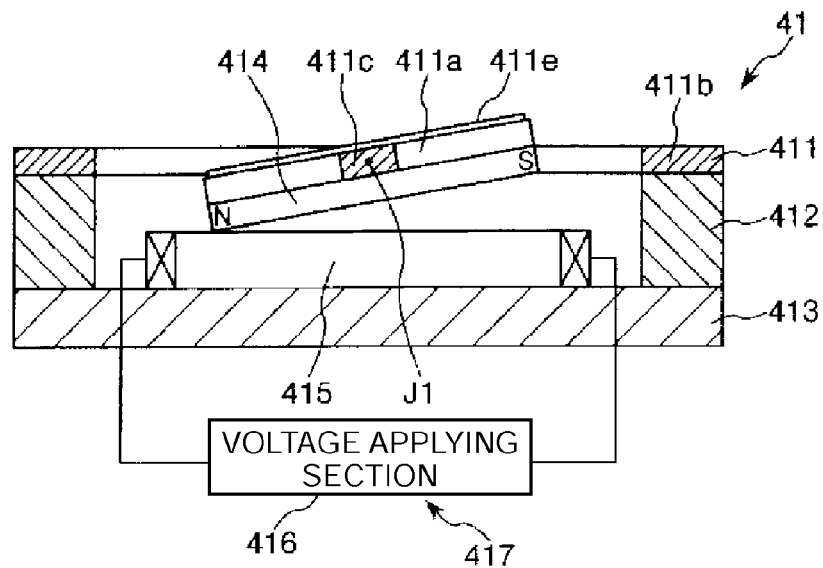
FIGS. 5A and 5B are sectional views for explaining the operation of the optical scanner shown in FIG. 4.
Figure 5B:
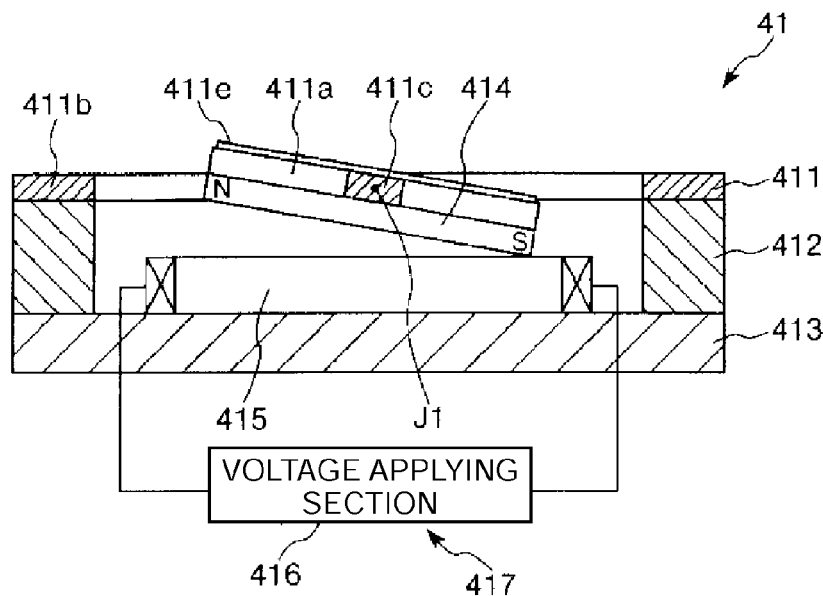
Figure 6:
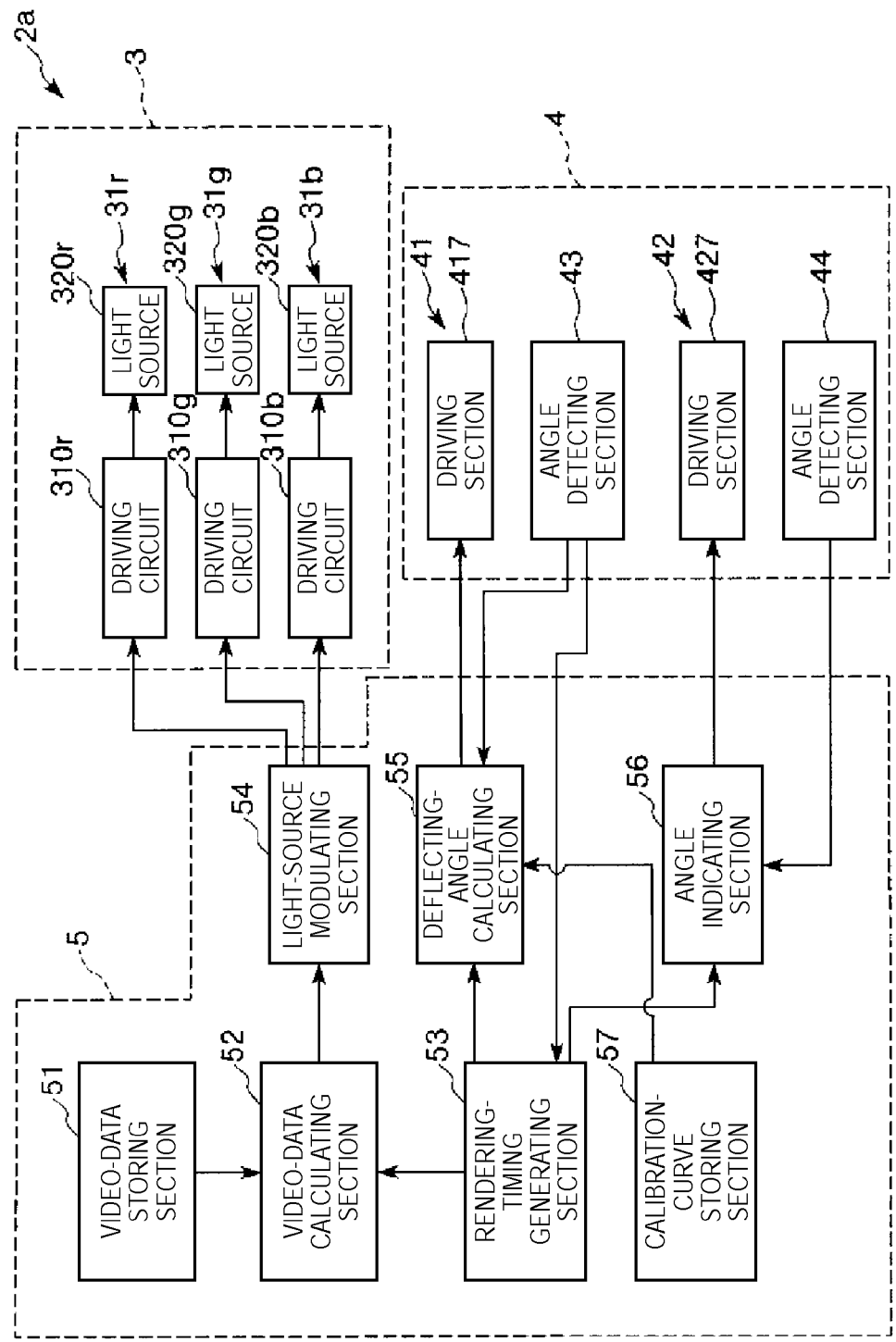
FIG. 6 is a block diagram showing a control system (an operation control section, a light scanning section, and a light source unit) of the projector shown in FIG. 3.
Figure 7:
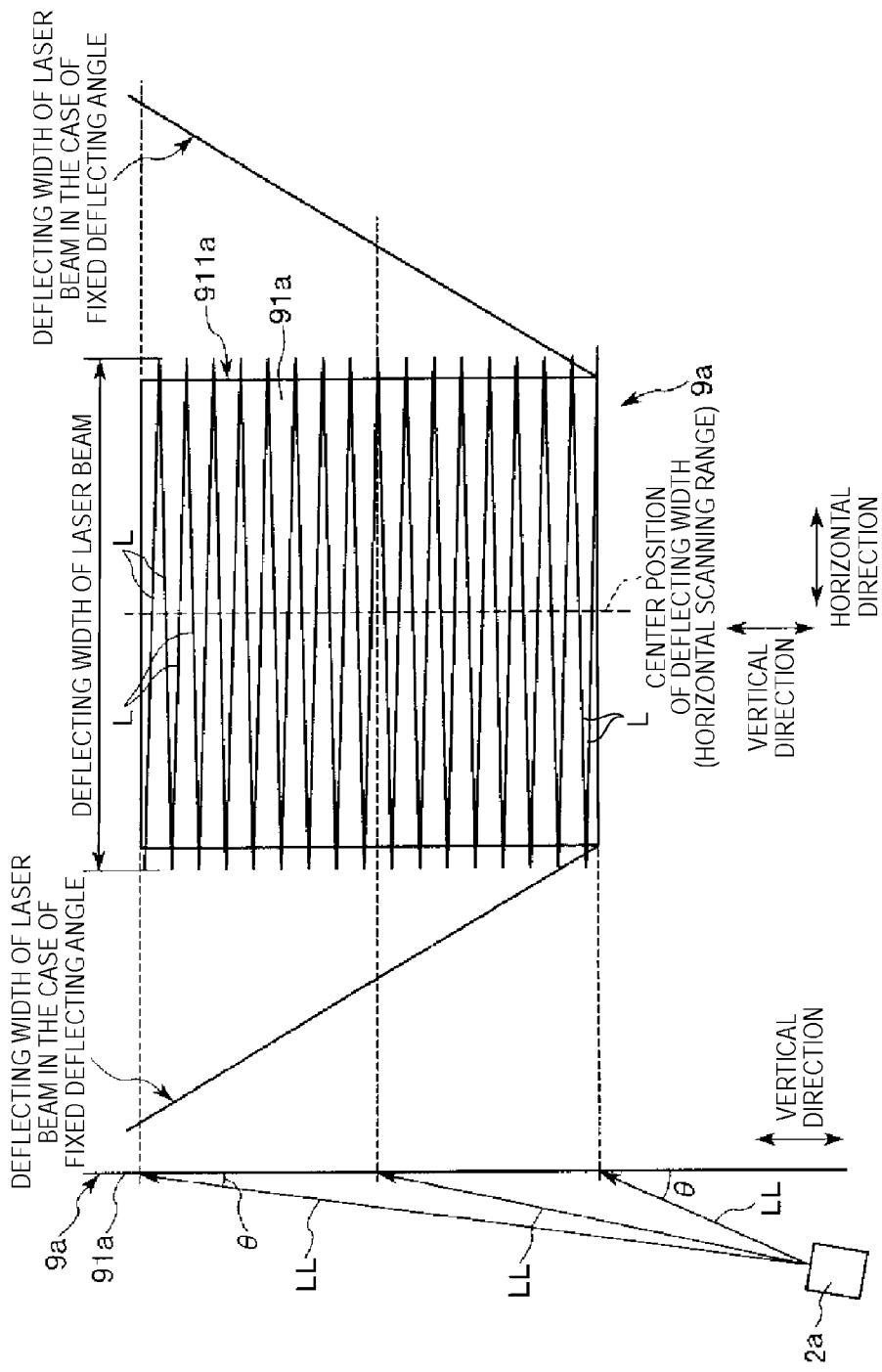
FIGS. 7A and 7B are a side view and a front view for explaining the operation of the projector shown in FIG. 3.
Figure 8:
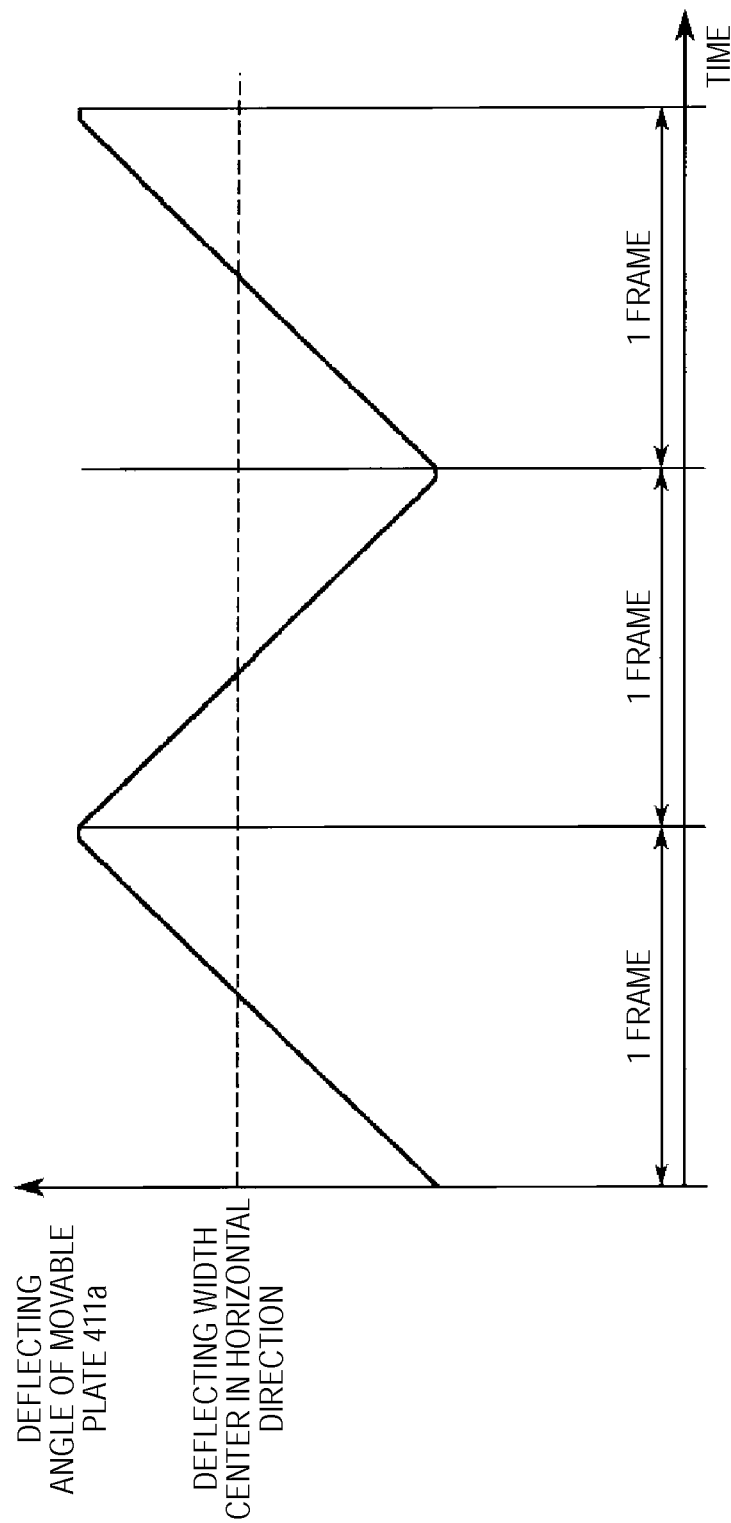
FIG. 8 is a graph showing transition of a deflecting angle (a change with time of the deflecting angle) of a movable plate of the optical scanner (an optical scanner for horizontal scanning) during the operation of the projector shown in FIG. 3.
Figure 9:
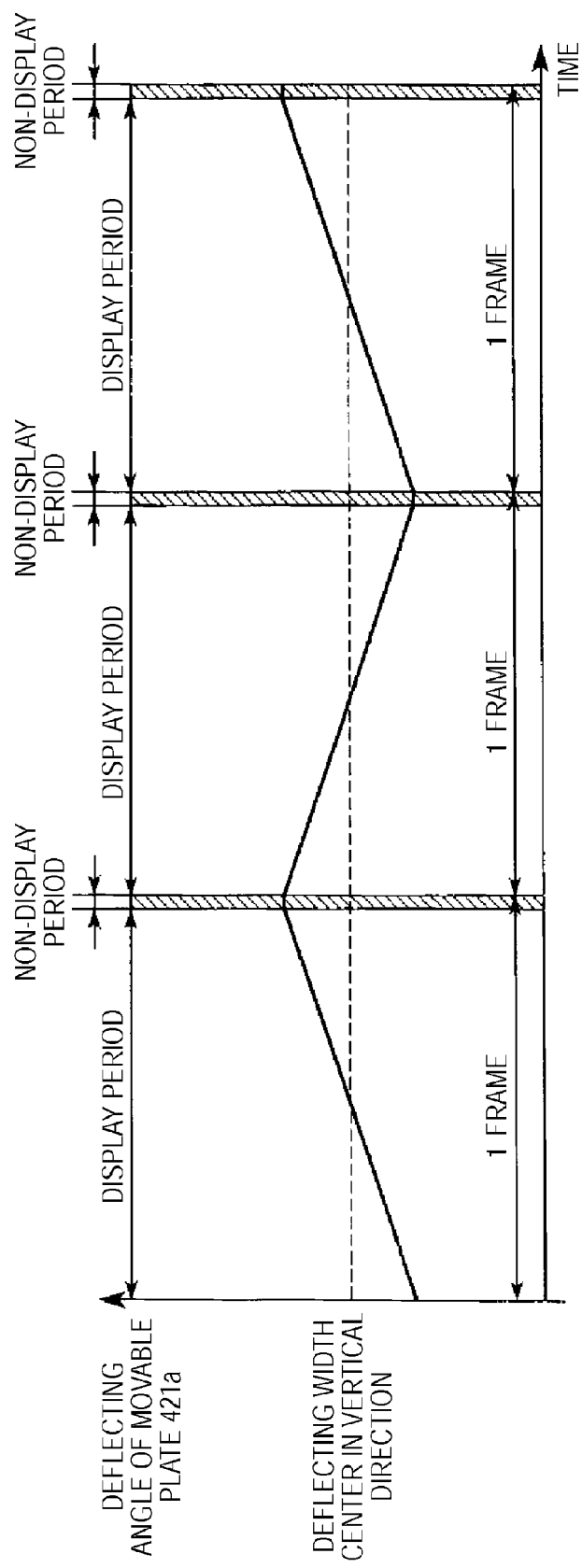
FIG. 9 is a graph showing transition of a deflecting angle (a change with time of the deflecting angle) of a movable plate of the optical scanner (an optical scanner for vertical scanning) during the operation of the projector shown in FIG. 3.
Figure 10:
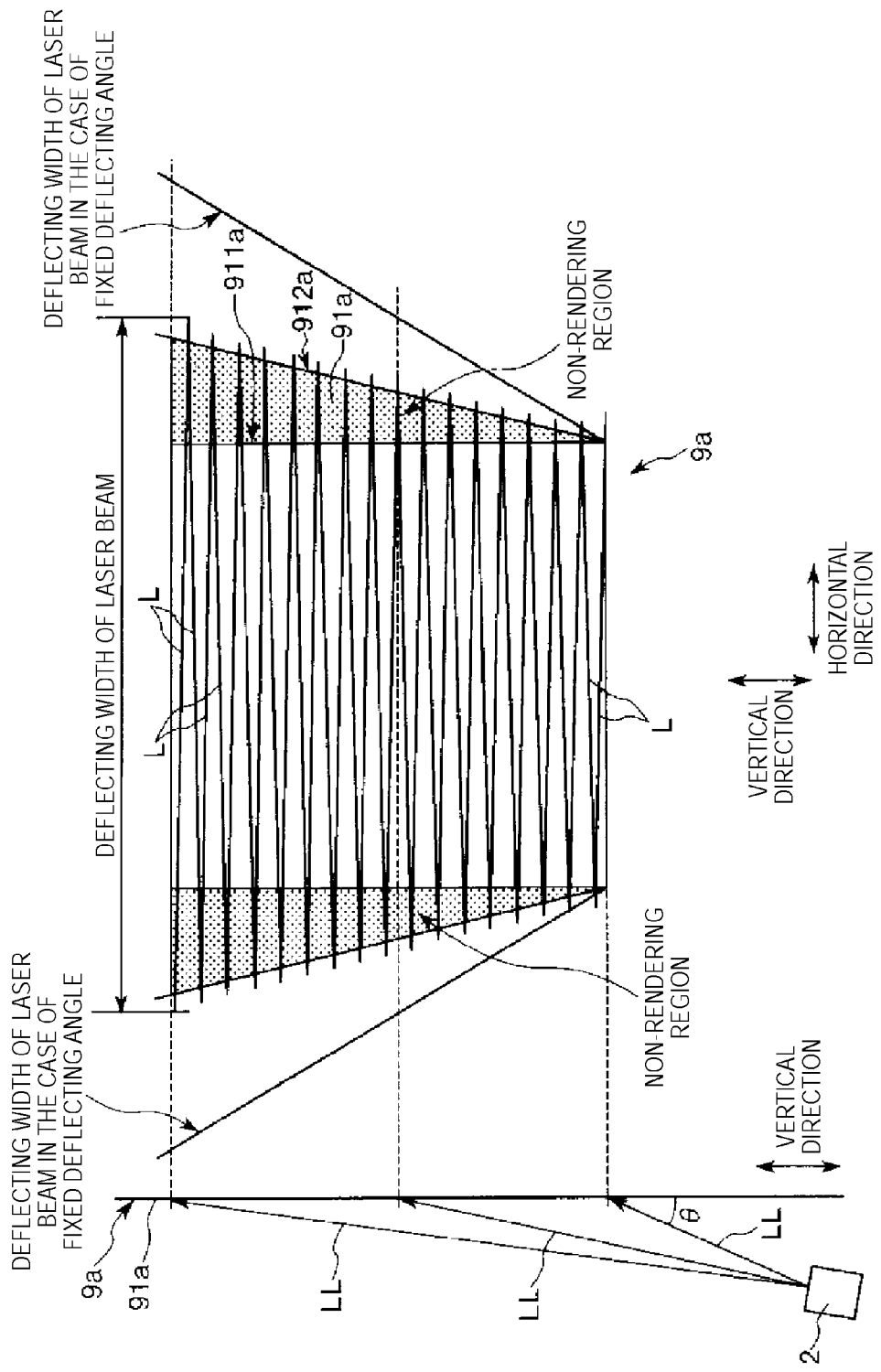
FIGS. 10A and 10B are a side view and a front view showing a modification of the operation of the projector shown in FIG. 3.
Figure 11:
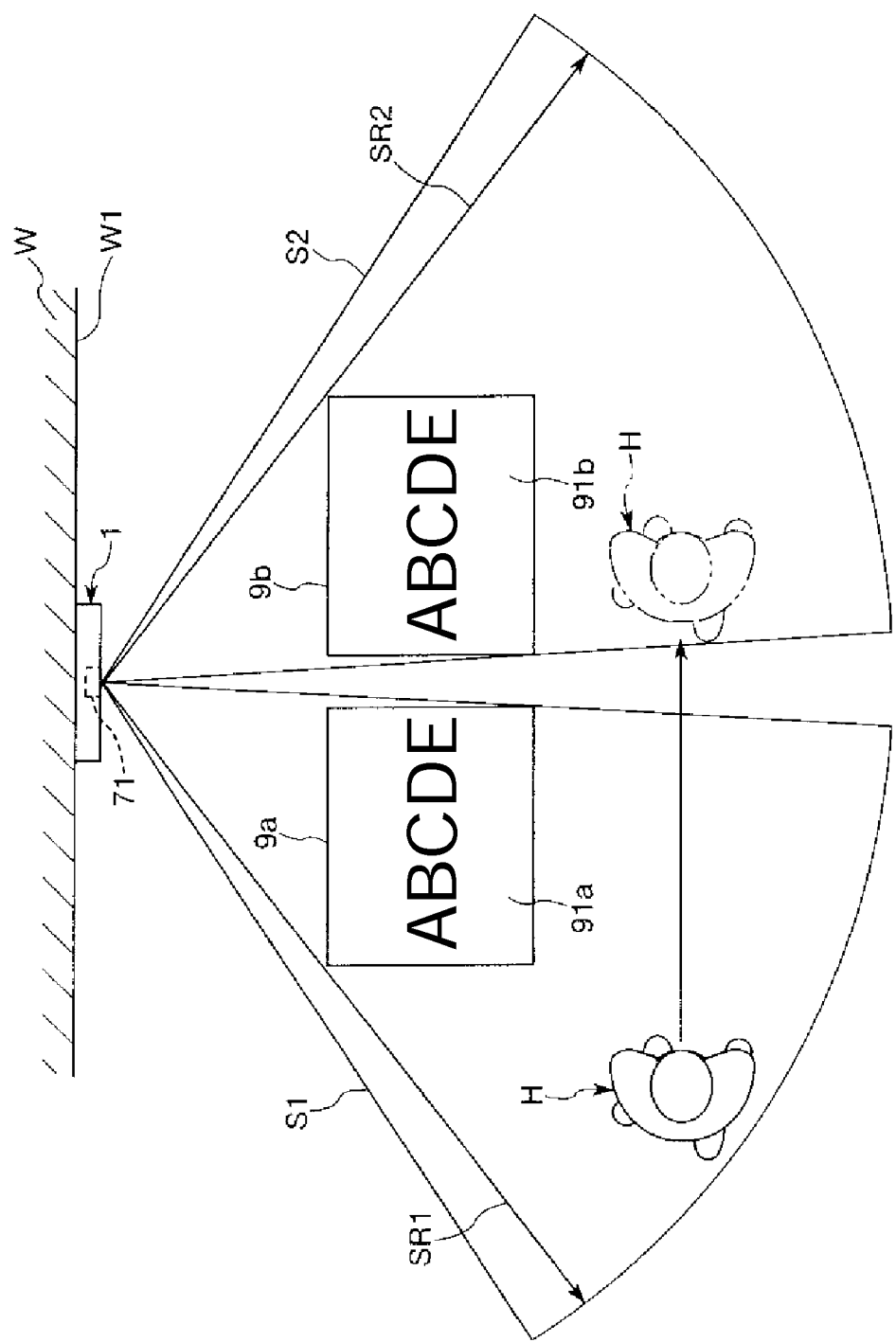
FIG. 11 is a top view showing a detection region of a human sensor (a moving object detection sensor) in the image forming apparatus shown in FIG. 1.
Figure 12A:
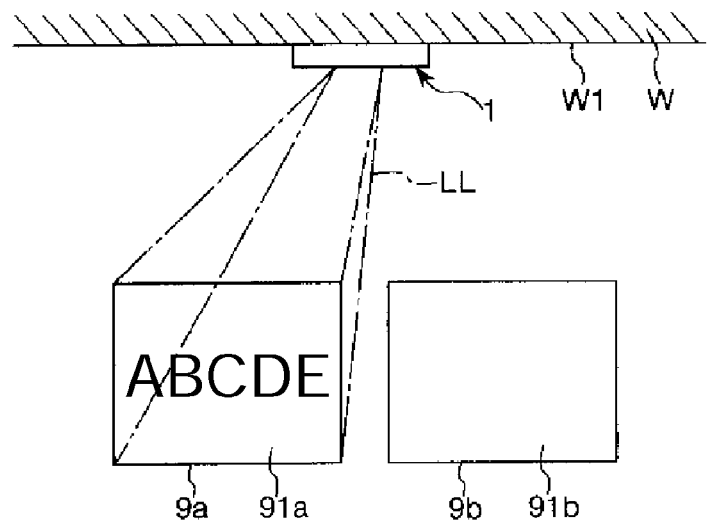
Figure 12B:
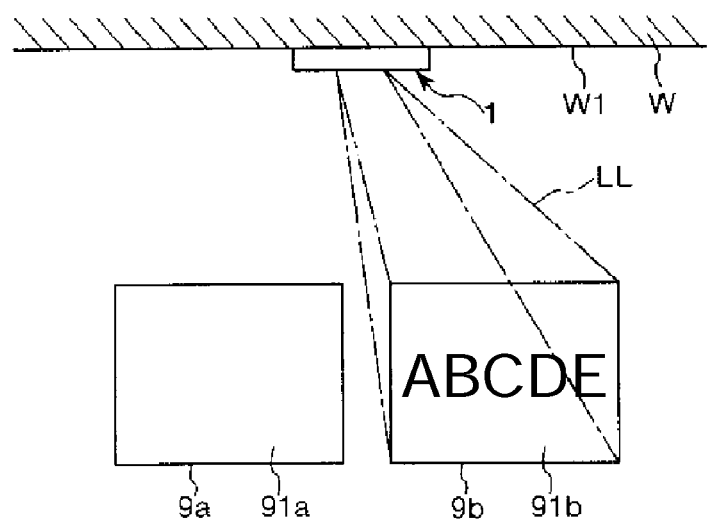
Figure 12C:
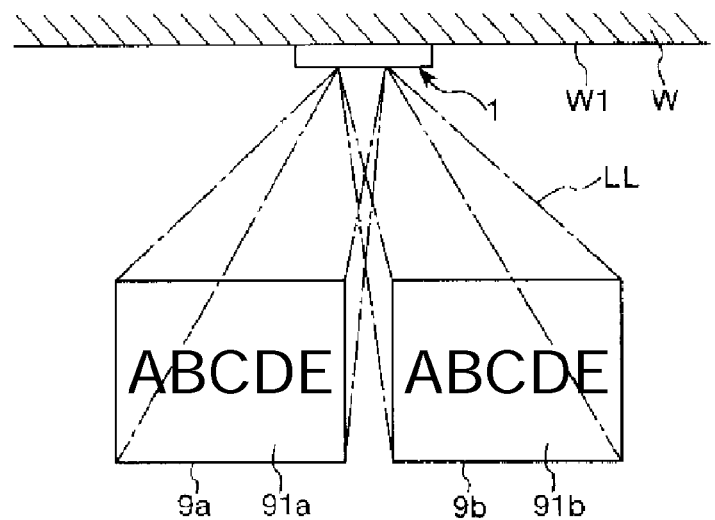

FIG. 1 is a diagram showing a first embodiment of the image forming apparatus according to the invention. FIG. 2 is a block diagram showing a schematic configuration of the image forming apparatus shown in FIG. 1. FIG. 3 is a diagram showing a schematic configuration of a projector included in the image forming apparatus shown in FIG. 2. FIG. 4 is a partial sectional perspective view of optical scanners included in the projector shown in FIG. 3. FIGS. 5A and 5B are sectional views for explaining the operation of the optical scanner shown in FIG. 4. FIG. 6 is a block diagram showing a control system (an operation control section, a light scanning section, and a light source unit) of the projector shown in FIG. 3. FIGS. 7A and 7B are a side view and a front view for explaining the operation of the projector shown in FIG. 3. FIG. 8 is a graph showing transition of a deflecting angle (a change with time of the deflecting angle) of a movable plate of the optical scanner (an optical scanner for horizontal scanning) during the operation of the projector shown in FIG. 3. FIG. 9 is a graph showing transition of a deflecting angle (a change with time of the deflecting angle) of a movable plate of the optical scanner (an optical scanner for vertical scanning) during the operation of the projector shown in FIG. 3. FIGS. 10A and 10B are a side view and a front view showing a modification of the operation of the projector shown in FIG. 3. FIG. 11 is a top view showing a detection region of a human sensor (a moving object detection sensor) in the image forming apparatus shown in FIG. 1. FIGS. 12A to 12C are top views for explaining switching of a display position of an image in the image forming apparatus shown in FIG. 1, wherein FIG. 12A is a diagram showing a first state, FIG. 12B is a diagram showing a second state and FIG. 12C is a diagram showing a third state. In the following explanation, for convenience of explanation, an upper side, a lower side, a right side, and a left side in FIGS. 4, 5, 7A and 7B, and 10A and 10B are respectively referred to "upper", "lower", "right", and "left".

An image forming apparatus 1 shown in FIG. 1 is an apparatus that alternately (sequentially) displays a predetermined image such as a still image or a moving image (in particular, a commercial or promotion video) on display surfaces 91*a* and 91*b* of two screens (display objects) 9*a* and 9*b* set on a floor surface F1 of a floor F of a building or the like.

In this embodiment, the display surfaces 91*a* and 91*b* are set on the screens 9*a* and 9*b* set on the same surface, i.e., the floor surface F1 and are set in positions different from each other.

In this embodiment, the display surface 91*a* is a first display section and the display surface 91*b* is a second display section set in a position different from the position of the display surface 91*a*. A plane set along the floor surface F1 is a first plane on which the display surface 91*a* is set. A plane set along a wall surface W1 is a second plane. The floor surface F1 and the wall surface W1 are respectively planes but may have curved sections and irregularities.

In this way, the image is alternately displayed on the display surface 91*a* as the first display section and the display surface 91*b* as the second display section (i.e., a position where the image is displayed is changed). This makes possible to switch the display of the image in at least two display sections. Consequently, even if areas of the display surface 91*a* and the display surface 91*b* are relatively small, it is possible to cause people present around the image forming apparatus 1 to easily recognize the presence of the image. Even if video data in use is video data concerning a still image or a moving image with little change, it is possible to improve expression power by the image by changing a position where the image is displayed.

Therefore, for example, when an image for advertisement such as a commercial or promotion video is used as a displayed image, the image forming apparatus 1 can show an excellent advertisement function.

In this embodiment, since the image is displayed on the display surfaces 91*a* and 91*b* set on the surfaces of the screens 9*a* and 9*b*, the display surfaces 91*a* and 91*b* can have optical characteristics suitable for the display of the image. Therefore, it is possible to improve visibility of the image irrespective of a material or the like of a place (in this embodiment, the floor) where the image is displayed. A material forming the screens 9*a* and 9*b* is not specifically limited. Examples of the material include polyethylene, polypropylene, polyvinyl chloride, polystyrene, polyamide, acrylic resin, ABS resin, fluoric resin, epoxy resin, and silicone resin, and a copolymer, a blended body, or a polymer alloy mainly containing any one of the foregoing. One of the materials or a combination of two or more of the materials can be used.

As shown in FIG. 2, the image forming apparatus 1 includes a projector (a first projector) 2*a* that scans light on the display surface 91*a* and displays an image (renders an image) on the display surface 91*a*, a projector (a second projector) 2*b* that scans light on the display surface 91*b* and displays an image on the display surface 91*b*, a human sensor (a moving object detection sensor) 7 that detects presence or absence of a person (a moving object) near the screen 9*a*, and a control section (a switching section) 8 that controls driving of the projectors 2*a* and 2*b* on the basis of a detection result of the human sensor 7. The image forming apparatus 1 has a housing 11. The projectors 2*a* and 2*b*, the human sensor 7, and the control section 8 are housed in the housing 11.

Such an image forming apparatus 1 displays an image using the projectors 2*a* and 2*b* of a light scanning type. Therefore, the apparatus is inexpensive and easily set compared with an image forming apparatus including a flat panel display such as an LED panel, a liquid crystal panel, or an organic EL panel.

The sections included in the image forming apparatus 1 are sequentially explained below in detail.

Projectors

The projector 2*a* as the first projector scans light on the display surface 91*a* to thereby display an image on the display surface 91*a*.

On the other hand, the projector 2*b* as the second projector scans light on the display surface 91*b*, which is set in the position different from the position of the display surface 91*a*, to thereby display an image on the display surface 91*b*.

The projector 2*a* is explained below. Since the projector 2*a* and the projector 2*b* have the same configuration, the projector 2*a* is representatively explained below. Explanation of the projector 2*b* is omitted.

As shown in FIG. 3, the projector 2*a* includes a light source unit (a light emitting section) 3 that emits light, a light scanning section 4 that scans the light emitted from the light source unit 3 on the display surface 91*a*, and a distortion correcting section (an operation control device) 5 that corrects distortion of an image displayed on the display surface 91*a* (keystone correction).

Light Source Unit (Light Emitting Section)

As shown in FIG. 3, the light source unit 3 includes laser beam sources 31*r*, 31*g*, and 31*b* for red, green, and blue and collimator lenses 32*r*, 32*g*, and 32*b* and dichroic mirrors 33*r*, 33*g*, and 33*b* provided to correspond to the laser beams sources 31*r*, 31*g*, and 31*b* for the colors.

The laser beam sources 31*r*, 31*g*, and 31*b* respectively have driving circuits 310*r*, 310*g*, and 310*b* and a light source 320*r* for red, a light source 320*g* for green, and a light source 320*b* for blue (see FIG. 6). As shown in FIG. 3, the laser beam sources 31*r*, 31*g*, and 31*b* respectively emit laser beams RR, GG, and BB of red, green, and blue. The laser beams RR, GG, and BB are emitted while being respectively modulated according to driving signals transmitted from a light-source modulating section 54 explained later of the distortion correcting section 5. The laser beams RR, GG, and BB are respectively parallelized by the collimator lenses 32r, 32g, and 32b as collimate optical elements to be converted into thin beams.

The dichroic mirrors 33r, 33g, and 33b respectively have characteristics for reflecting the red laser beam RR, the green laser beam GG, and the blue laser beam BB. The dichroic mirrors 33r, 33g, and 33b combine the laser beams RR, GG, and BB of the colors to emit one laser beam (light) LL.

Collimator mirrors can also be used instead of the collimator lenses 32r, 32g, and 32b. In this case, it is also possible to form thin beams of parallel light beams. When the parallel light beams are emitted from the laser beam sources 31r, 31g, and 31b for the colors, the collimator lenses 32r, 32g, and 32b can be omitted. The laser beam sources 31r, 31g, and 31b can be replaced with light sources such as light emitting diodes that generate the same light beams. The order of the laser beams sources 31r, 31g, and 31b for the colors, the collimator lenses 32r, 32g, and 32b, and the dichroic mirrors 33r, 33g, and 33b shown in FIG. 3 is only an example. It is possible to freely set the order while keeping the combination of the colors (the laser beam source 31r, the collimator lens 32r, and the dichroic mirror 33r are for red, the laser beam source 31g, the collimator lens 32g, and the dichroic mirror 33g are for green, and the laser beam source 31b, the collimator lens 32b, and the dichroic mirror 33b are for blue). For example, a combination of blue, red, and green in order from ones closest to the light scanning section 4 is also possible.

Light Scanning Section

The light scanning section 4 scans the laser beam LL emitted from the light source unit 3 on the display surface 91a in the horizontal direction (a first direction) (horizontal scanning: main scanning) and scans the laser beam LL in the vertical direction (a second direction orthogonal to the first direction) at scanning speed lower than scanning speed in the horizontal direction (vertical scanning: sub-scanning) to two-dimensionally scan the laser beam LL.

The light scanning section 4 includes an optical scanner (a first direction scanning section) 41 as a mirror for horizontal scanning that scans the laser beam LL, which is emitted from the light source unit 3, on the display surface 91a in the horizontal direction, an angle detecting section (a behavior detecting section) 43 that detects an angle (behavior) of a movable plate 411a explained later of the optical scanner 41, an optical scanner (a second direction scanning section) 42 as a mirror for vertical scanning that scans the laser beam LL, which is emitted from the light source unit 3, on the display surface 91a in the vertical direction, and an angle detecting section (a behavior detecting section) 44 that detects an angle (behavior) of a movable plate 421a explained later of the optical scanner 42.

The configuration of the optical scanners 41 and 42 is explained below. Since the optical scanners 41 and 42 have the same configuration, the optical scanner 41 is representatively explained below. Explanation of the optical scanner 42 is omitted.

As shown in FIG. 4, the optical scanner 41 is an optical scanner of a so-called one degree of freedom system (one-dimensional scanning). The optical scanner 41 includes a substrate 411, a counter substrate 413 provided to be opposed to the lower surface of the substrate 411, and a spacer member 412 provided between the substrate 411 and the counter substrate 413.

The substrate 411 includes a movable plate 411a, a supporting section 411b that pivotably supports the movable plate 411a, and a pair of coupling sections 411c and 411d that couple the movable plate 411a and the supporting section 411b.

The movable plate 411a is formed in a substantially rectangular shape in plan view thereof. A light reflecting section (a mirror) 411e having light reflectivity is provided on the upper surface of such a movable plate 411a. The surface (the upper surface) of the light reflecting section 411e forms a reflecting surface that reflects light. The light reflecting section 411e is formed of, for example, a metal film of Al, Ni, or the like. A permanent magnet 414 is provided on the lower surface of the movable plate 411a.

The supporting section 411b is provided to surround the outer periphery of the movable plate 411a in the plan view of the movable plate 411a. In other words, the supporting section 411b is formed in a frame shape and the movable plate 411a is located on the inner side thereof.

The coupling section 411c couples the movable plate 411a and the supporting section 411b on the left side of the movable plate 411a. The coupling section 411d couples the movable plate 411a and the supporting section 411b on the right side of the movable plate 411a.

The coupling sections 411c and 411d are formed in a rectangular shape. The coupling sections 411c and 411d can be elastically deformed. Such a pair of coupling sections 411c and 411d are provided coaxially with each other. The movable plate 411a pivots with respect to the supporting section 411b around this axis (hereinafter referred to as "pivot center axis J1").

Such a substrate 411 is formed of, for example, silicon as a main material. The movable plate 411a, the supporting section 411b, and the coupling sections 411c and 411d are integrally formed. Since silicon is the main material, excellent pivoting properties can be realized and excellent durability can be shown. Since silicon can be finely processed, when the substrate 411 is formed of silicon as the main material, it is possible to achieve excellent dimensional accuracy of the substrate 411 and excellent oscillation properties of the optical scanner 41. Further, it is possible to realize a reduction in size of the optical scanner 41.

The spacer member 412 is formed in a frame shape. The upper surface of the spacer member 412 is joined to the lower surface of the substrate 411. The spacer member 412 is substantially the same as the shape of the supporting section 411b in the plan view of the movable plate 411a. Such a spacer member 412 is formed of, for example, various kinds of glass, various kinds of ceramics and silicon, or $SiO_2$.

A method of joining the spacer member 412 and the substrate 411 is not specifically limited. For example, the spacer member 412 and the substrate 411 may be joined via another member such as an adhesive. Depending on, for example, a material forming the spacer member 412, direct joining, anode joining, or the like may be used.

Like the spacer member 412, the counter substrate 413 is formed of, for example, various kinds of glass, silicon, or $SiO_2$. A coil 415 is provided in a region opposed to the movable plate 411a on the upper surface of such a counter substrate 413.

The permanent magnet 414 is formed in a plate bar shape and provided along the lower surface of the movable plate 411a. Such a permanent magnet 414 is magnetized in a direction orthogonal to the pivot center axis J1 in the plan view of the movable plate 411a. In other words, the permanent magnet 414 is provided such that a segment connecting both the poles U (the S pole and the N pole) is orthogonal to the pivot center axis J1.

Such a permanent magnet 414 is not specifically limited. For example, a neodium magnet, a ferrite magnet, a samarium cobalt magnet, or an Alnico magnet can be used.

The coil 415 is provided to surround the outer periphery of the permanent magnet 414 in the plan view of the movable plate 411a.

The optical scanner 41 includes a voltage applying section 416 that applies voltage to the coil 415. The voltage applying section 416 can adjust (change) conditions such as a voltage value of the applied voltage, a frequency, and the like. A driving section 417 for pivoting the movable plate 411a is configured by the voltage applying section 416, the coil 415, and the permanent magnet 414.

Predetermined voltage is applied to the coil 415 from the voltage applying section 416 and predetermined electric current flows to the coil 415.

For example, alternating voltage is applied from the voltage applying section 416 to the coil 415, electric current flows according to the alternating voltage, a magnetic field is generated in a thickness direction of the movable plate 411a (an up to down direction in FIG. 4), and a direction of the magnetic field is periodically switched. Specifically, a state A in which a section near the upper side of the coil 415 is the S pole and a section near the lower side thereof is the N pole and a state B in which the section near the upper side of the coil 415 is the N pole and the section near the lower side thereof is the S pole are alternately switched. In that case, the voltage applying section 416 is controlled to be driven by the distortion correcting section 5 explained below.

In the state A, as shown in FIG. 5A, a section on the right side of the permanent magnet 414 is displaced to the upper side by repulsion force between the permanent magnet 414 and a magnetic field generated by energization to the coil 415. A section on the left side of the permanent magnet 414 is displaced to the lower side by suction force between the permanent magnet 414 and the magnetic field. Consequently, the movable plate 411a pivots counterclockwise and inclines.

On the other hand, in the state B, as shown in FIG. 5B, a section on the right side of the permanent magnet 414 is displaced to the lower side and the section on the left side of the permanent magnet 414 is displaced to the upper side. Consequently, the movable plate 411a pivots clockwise and inclines.

The state A and the state B are alternately repeated, whereby the movable plate 411a pivots (oscillates) around the pivot center axis J1 while torsionally deforming the coupling sections 411c and 411d.

The voltage applied from the voltage applying section 416 to the coil 415 is adjusted by the control by the distortion correcting section 5 explained later, whereby the flowing electric current can be adjusted. This makes it possible to adjust a deflecting angle (amplitude) of the pivoting around the pivot center axis J1 of the movable plate 411a (the reflecting surface of the light reflecting section 411e).

The configuration of such an optical scanner 41 is not specifically limited as long as the movable plate 411a can be pivoted. For example, the optical scanner 41 may have a two degree of freedom system. A driving system of the optical scanner 41 may be, for example, piezoelectric driving using a piezoelectric element or electrostatic driving using electrostatic attraction instead of electromagnetic driving using the coil 415 and the permanent magnet 414.

As shown in FIG. 3, the optical scanners 41 and 42 having the configuration explained above are provided such that directions of pivot center axes J1 and J2 thereof are orthogonal to each other. Since the optical scanners 41 and 42 are provided in this way, the laser beam LL emitted from the light source unit 3 can be scanned on the display surface 91a two-dimensionally (in two directions orthogonal to each other). This makes it possible to render a two-dimensional image on the display surface 91a with a relatively simple configuration.

Specifically, the light emitted from the light source unit 3 is reflected on the reflecting surface of the light reflecting section 411e of the optical scanner 41. Subsequently, the light is reflected on a reflecting surface of a light reflecting section 421e of the optical scanner 42 and projected (irradiated) on the display surface 91a of the screen 9a. At this point, the light reflecting section 411e of the optical scanner 41 is pivoted and the light reflecting section 421e of the optical scanner 42 is pivoted at angular velocity lower than angular velocity (speed) of the light reflecting section 411e. Consequently, the laser beam LL emitted from the light source unit 3 is scanned on the display surface 91a in the horizontal direction and scanned in the vertical direction at scanning speed lower than scanning speed in the horizontal direction. In this way, the laser beam LL emitted from the light source unit 3 is two-dimensionally scanned on the display surface 91a and an image is rendered on the display surface 91a.

In order to pivot the light reflecting section 421e of the optical scanner 42 at angular velocity lower than the angular velocity of the light reflecting section 411e of the optical scanner 41, for example, the optical scanner 41 may be driven by resonant driving that makes use of resonance or may be driven by non-resonant driving that does not make use of resonance. When both the optical scanners 41 and 42 are driven by the resonant driving, the optical scanners 41 and 42 only have to be designed such that a resonant frequency of the optical scanner 41 (a resonant frequency of an oscillating system including the movable plate 411a and the coupling sections 411c and 411d) is higher than a resonant frequency of the optical scanner 42.

The light emitted from the light source unit 3 may be reflected on the light reflecting section 421e of the optical scanner 42 first and, then, reflected on the light reflecting section 411e of the optical scanner 41. In other words, it is also possible that the vertical scanning is performed first and, then, the horizontal scanning is performed.

The angle detecting section 43 that detects an angle of the movable plate 411a of the optical scanner 41 is explained below. Since the configuration of the angle detecting section 44 that detects an angle of the movable plate 421a of the optical scanner 42 is the same as that of the angle detecting section 43, explanation of the angle detecting section 44 is omitted.

As shown in FIG. 4, the angle detecting section 43 includes a piezoelectric element 431 provided on the coupling section 411c of the optical scanner 41, an electromotive-force detecting section 432 that detects electromotive force generated by the piezoelectric element 431, and an angle detecting section 433 that calculates an angle (detects behavior) of the movable plate 411a on the basis of a detection result of the electromotive-force detecting section 432.

When the coupling section 411c is torsionally deformed according to the pivoting of the movable plate 411a, the piezoelectric element 431 is deformed according to the torsional deformation of the coupling section 411c. The piezoelectric element 431 has a characteristic that, when the piezoelectric element 431 is deformed from a natural state in which external force is applied, the piezoelectric element 431 generates electromotive force corresponding to an amount of the deformation (or a characteristic that resistance changes according to the deformation amount). Therefore, the angle detecting section 433 calculates a degree of the torsion of the coupling section 411c on the basis of the magnitude of the electromotive force (or the resistance) detected by the electromotive-force detecting section 432 and calculates an angle of the movable plate 411a (the reflecting surface of the light reflecting section 411e) from the degree of the torsion. The angle detecting section 433 calculates a deflecting angle around the pivot center axis J1 of the movable plate 411a. A signal including information of the angle and the deflecting angle of the movable plate 411a is transmitted from the angle detecting section 433 to the distortion correcting section 5.

A reference (0°) of the detected angle of the movable plate 411a can be set in any state of the optical scanner 41, for example, in an initial state of the optical scanner 41 (a state in which voltage is not applied to the coil 415).

The detection of an angle of the movable plate 411a may be performed on a real time basis (continuously) or may be performed intermittently. The angle detecting section 43 is not limited to the angle detecting section including the piezoelectric element as in this embodiment as long as an angle of the movable plate 411a can be detected. For example, an optical sensor may be used as the angle detecting section 43.

Distortion Correcting Section

The distortion correcting section 5 is explained below.

In the projector 2a, when an image is displayed (rendered) on the display surface 91a by using the pair of optical scanners 41 and 42, distortion due to an optical path difference to the display surface 91a, for example, distortion called "keystone distortion" in which the length in the lateral direction (the horizontal direction) is different on the upper side and the lower side of the image displayed on the display surface 91a occurs. The distortion correcting section 5 has a function of correcting such distortion of the image.

This makes it possible to display images on the display surface 91a and the display surface 91b with distortion corrected. Therefore, for example, areas and shapes of the display surface 91a and the display surface 91b can be equalized.

The distortion correcting section 5 is explained in detail below.

As shown in FIG. 6, the distortion correcting section 5 includes a video-data storing section 51 that stores video data (image data) used in rendering an image, a video-data calculating section 52, a rendering-timing generating section 53, a light-source modulating section (a light modulating section) 54, a deflecting-angle calculating section (an amplitude calculating section) 55, an angle indicating section 56, and a calibration-curve storing section 57 that stores a calibration curve.

The projector 2a performs scanning in the vertical direction (hereinafter also simply referred to as "vertical scanning") in each of a forward path and a backward path of and performs scanning in the horizontal direction (hereinafter also simply referred to as "horizontal scanning") in the forward path and the backward path of the vertical scanning to thereby display (render) an image on the display surface 91a.

The projector 2a adjusts, in performing the horizontal scanning, a deflection angle of the movable plate 411a such that deflecting width in the horizontal direction of the laser beam LL (hereinafter also simply referred to as "deflecting width of the laser beam (light) LL") on the display surface 91a in a light emission state in which the laser beam LL is emitted from the light source unit 3 (hereinafter also simply referred to as "light emission state") is the same along the vertical direction compared with a case in which adjustment (adjustment by an adjusting section) of a deflecting angle around the pivot center axis J1 of the movable plate 411a (hereinafter also simply referred to as "deflecting angle of the movable plate 411a") is not performed. In particular, the projector 2a desirably adjusts the deflecting angle of the movable plate 411a such that the deflecting width of the laser beam LL in the light emission state is fixed along the vertical direction. This makes it possible to prevent keystone distortion of an image while increasing a time aperture ratio, which is a ratio of a period in which image rendering is performed in one frame. In this embodiment, a case in which the deflecting width is adjusted to be fixed along the vertical direction is representatively explained.

The deflecting width (a scanning range) is a distance (a space) in the horizontal direction between a position of the laser beam LL on the same plane as the display surface 91a at the time when the movable plate 411a pivots to a maximum angle clockwise (in a predetermined direction) in the light emission state and a position of the laser beam LL on the same plane as the display surface 91a at the time when the movable plate 411a subsequently pivots to a maximum angle counterclockwise (in a direction opposite to the predetermined direction). In other words, as shown in FIGS. 7A and 7B, the deflecting width is length in the horizontal direction of each of plural rendering lines (scanning lines) L that is a track of the laser beam LL on the display surface 91a at the time when the laser beam LL is two-dimensionally scanned on the display surface 91a in the light emission state.

As shown in FIGS. 7A and 7B, the plural rendering lines L are arranged in zigzag. Among the rendering lines L, the rendering lines at the left side end and the right side end are not suitable for rendering because angular velocity (speed) of the light reflecting section 411e of the optical scanner 41 is small. Therefore, a rendering region (a display region) 911a, which is a region where an image is rendered (displayed), is set excluding the left side end and the right side end. The rendering region 911a is set to form, for example, a rectangle (including a square). FIGS. 7A and 7B are simplified for convenience of explanation.

When the deflecting angle of the movable plate 411a of the optical scanner 41 is fixed, the deflecting width of the laser beam LL in the light emission state changes according to an angle of the movable plate 421a of the optical scanner 42. The deflecting width is larger as a position in the vertical direction on the display surface 91a on which the laser beam LL is scanned (a position in the vertical direction of the rendering lines L) is farther from the projector 2a. Therefore, the projector 2a adjusts the deflecting angle of the movable plate 411a according to the angle of the movable plate 421a. Specifically, as the position in the vertical direction on the display surface 91a on which the laser beam LL is scanned (the position in the vertical direction of the rendering lines L) is farther from the projector 2a, the projector 2a sets the deflecting angle of the movable plate 411a smaller to thereby fix the deflecting width of the laser beam LL in the light emission state along the vertical direction.

In the calibration-curve storing section 57, a calibration curve of a table, a formula (a function), or the like is stored. The calibration curve indicates a relation between the position in the vertical direction on the display surface 91a of the laser beam LL scanned on the display surface 91a (the position in the vertical direction of the rendering lines L) and the deflecting angle of the movable plate 411a with which the deflecting width of the laser beam LL is fixed along the vertical direction in the light emission state. When an image is rendered, a target value of the deflecting angle (a target deflecting angle) is calculated by using the calibration curve on the basis of the position in the vertical direction on the display surface 91a of the laser beam LL scanned on the display surface 91a. The calibration curve can be obtained by calculation and stored in the calibration-curve storing section 57 in advance.

In the projector 2a, it is desirable to adjust the angle and the angular velocity of the movable plate 421a such that a space in the vertical direction between the rendering lines L adjacent to each other among the odd-number-th rendering lines L from the upper side is fixed in the rendering region 911a and, similarly, a space in the vertical direction between the rendering lines L adjacent to each other among the even-number-th rendering lines L from the upper side is fixed. This makes it possible to prevent distortion in the vertical direction of an image.

In this embodiment, for example, the angle of the movable plate 421a is adjusted such that the space in the vertical direction between the rendering lines L adjacent to each other is fixed at each of the left side end and the right side end of the rendering region 911a in the start of rendering of the rendering lines L. The angular velocity of the movable plate 421a is set to a predetermined value. In other words, the angle of the movable plate 421a is adjusted such that a space in the vertical direction between rendering starting points adjacent to each other is fixed in the rendering lines L. The angular velocity of the movable plate 421a is set to a fixed value for each of the rendering lines L. As the position in the vertical direction of the rendering lines L is farther from the projector 2a, the angular velocity of the movable plate 421a is set small. This makes it possible to prevent distortion in the vertical direction of an image with relatively simple control.

The operation (the action) of the projector 2a in rendering an image on the display surface 91a of the screen 9a is explained below.

First, video data is input to the projector 2a. The input video data is temporarily stored in the video-data storing section 51. Rendering of an image is performed by using the video data read out from the video-data storing section 51. In this case, the rendering of an image may be started after all the video data is stored in the video-data storing section 51 or the rendering of an image may be started after a part of the video data is stored in the vide-data storing section 51. The video data may be stored in the video-data storing section 51 in parallel to the rendering of an image.

When the rendering of an image is started after a part of the video data is stored in the video-data storing section 51, first, video data for at least one frame, desirably, two or more frames (e.g., two frames) is stored in the video-data storing section 51. Thereafter, the rendering of an image is started. A reason for this is as explained below. In the projector 2a, since the horizontal scanning is performed in each of the forward path and the backward path of the vertical scanning to render an image (hereinafter also simply referred to as "reciprocating rendering in the vertical direction") and, as explained later, readout order of the video data from the video-data storing section 51 is reversed when an image is rendered in the forward path of the vertical scanning and when an image is rendered in the backward path of the vertical scanning. Therefore, when the rendering of an image is started in the backward path of the vertical scanning, in order to read out the video data from the opposite side, at least the video data for one frame used for the rendering of an image in the backward path needs to be stored in the video-data storing section 51.

The rendering-timing generating section 53 generates rendering timing information and rendering line information. The rendering timing information is sent to the video-data calculating section 52. The rendering line information is sent to the deflecting-angle calculating section 55.

The rendering timing information includes information concerning timing for performing rendering. The rendering line information includes information concerning a position in the vertical direction of the rendering line L on which rendering is performed (an angle of the movable plate 421a). A position of any section of the rendering line L may be set as the position in the vertical direction of the rendering line L. For example, the position is the tip on the left side, the tip on the left side, or the center.

The video-data calculating section 52 read out, on the basis of the rendering timing information input from the rendering-timing generating section 53, video data corresponding to a pixel to be rendered from the video-data storing section 51 and, after performing various kinds of correction calculation and the like, sends luminance data of the colors to the light-source modulating section 54.

The light-source modulating section 54 performs, on the basis of the luminance data of the colors input from the video-data calculating section 52, modulation of the light sources 320r, 320g, and 320b via the driving circuits 310r, 310g, and 310b. In other words, the light-source modulating section 54 turns on and off the light sources 320r, 320g, and 320b and performs, for example, adjustment (increase or decrease) of an output.

The angle detecting section 43 on the optical scanner 41 side detects an angle and a deflecting angle of the movable plate 411a and sends information concerning the angle and the deflecting angle (angle information of the movable plate 411a) to the rendering-timing generating section 53 and the deflecting-angle calculating section 55 of the distortion correcting section 5. The angle detecting section 44 on the optical scanner 42 side detects an angle of the movable plate 421a and sends information concerning the angle (angle information of the movable plate 421a) to the angle indicating section 56 of the distortion correcting section 5.

When the current rendering of the rendering line L ends and the information concerning the deflecting angle of the movable plate 411a is input from the angle detecting section 43, in synchronization with the input of the information, the rendering-timing generating section 53 sends, to the angle indicating section 56, target angle information (angle indication) indicating a target angle of the movable plate 421a at the time when the laser beam LL is irradiated on a rendering start point of the rendering line L on which rendering is performed next. The target angle of the movable plate 421a is set such that a space in the vertical direction between rendering start points adjacent to each other is fixed. The angle indicating section 56 compares the angle of the movable plate 421a detected by the angle detecting section 44 and the target angle of the movable plate 421a, performs correction to reduce a difference between the angels to zero, and sends driving data to a driving section 427 of the optical scanner 42.

The driving section 427 drives the optical scanner 42 (applies voltage to the coil) on the basis of the driving data. Consequently, when the laser beam LL is irradiated on the rendering start point, the angle of the movable plate 421a reaches the target angle.

In this embodiment, in the rendering lines L, the angular velocity of the movable plate 421a may be fixed from a rendering start point to a rendering end point and the scanning speed in the vertical direction of the laser beam LL may be fixed. The angular velocity of the movable plate 421a may be gradually changed and the scanning speed in the vertical direction of the laser beam LL may be gradually changed.

The rendering-timing generating section 53 sends the rendering line information, i.e., information concerning a position in the vertical direction of the rendering line L on which rendering is performed next to the deflecting-angle calculating section 55.

The deflecting-angle calculating section 55 calculates, using the calibration curve read out from the calibration-curve storing section 57 and on the basis of the information concerning the position in the vertical direction of the rendering line L for performing rendering next input from the rendering-timing generating section 53, a target deflecting angle of the movable plate 411*a* in the rendering line L on which the rendering is performed next. The deflecting-angle calculating section 55 sends, on the basis of the information concerning the deflecting angle of the movable plate 411*a* input from the angle detecting section 43 and the target deflecting angle of the movable plate 411*a*, the driving data to the driving section 417 of the optical scanner 41 such that the deflecting angle of the movable plate 411*a* reaches the target deflecting angle.

The driving section 417 applies, on the basis of the driving data, effective voltage having a frequency same as the resonant frequency of the optical scanner 41 to the coil 415 and feeds electric current to the coil 415, generates a predetermined magnetic field, and changes the magnitude of effective current and a phase difference between the optical scanner 41 and a driving waveform to supply energy to the optical scanner and deprive energy from the optical scanner 41. Consequently, the deflecting angle of the resonating movable plate 411*a* reaches the target deflecting angle. In this way, the driving section 417 sequentially scans the laser beam LL on the rendering lines L in the rendering region 911*a* and renders an image while adjusting the deflecting angle of the movable plate 411*a* such that the deflecting angle of the movable plate 411*a* reaches the target deflecting angle on the basis of the information concerning the deflecting angle of the movable plate 411*a* detected by the angle detecting section (a detection result) and the target deflecting angle (a target value).

The rendering-timing generating section 53 performs management concerning whether a frame in which rendering is performed is an odd-number frame (an odd-number-th frame) or an even-number frame (an even-number-th frame) and determines a pivoting direction (a moving direction) of the movable plate 421*a* and readout order for video data from the video-data storing section 51 according to the management. Specifically, the rendering-timing generating section 53 reverses the readout order for video data when an image is rendered in the odd-number frame (in the forward path of the scanning in the vertical direction) and when an image is rendered in the even-number frame (in the backward path of the scanning in the vertical direction).

The rendering-timing generating section 53 scans the laser beam LL on the same line of the display surface 91*a* in the odd-number frame and the even-number frame. In other words, the rendering-timing generating section 53 scans the laser beam LL such that the rendering lines L of the odd-number frame and the rendering lines L of the even number frame coincide with each other.

Specifically, for example, as shown in FIGS. 7A and 7B, concerning a first frame (an odd-number-th frame), the rendering-timing generating section 53 starts rendering from the upper left and performs the rendering to the lower right in zigzag. Concerning a second frame (an even-number-th frame), the rendering-timing generating section 53 reverses the pivoting direction of the movable plate 421*a* and performs rendering from the lower right to the upper left in a manner opposite to that explained above. Thereafter, in the same manner, concerning odd-number-th frames, the rendering-timing generating section 53 performs rendering from the upper left to the lower right and, concerning even-number-th frames, the rendering-timing generating section 53 performs rendering from the lower right to the upper left.

In this embodiment, the forward path of the scanning in the vertical direction is the odd-number frame and the backward path of the scanning in the vertical direction is the even-number frame. However, the invention is not limited to this. The backward path of the scanning in the vertical direction may be the odd-number frame and the forward path of the scanning in the vertical direction may be the even-number frame.

In this embodiment, the position where rendering is started for the first frame is the upper left. However, the invention is not limited to this. The position may be, for example, upper right, the lower left, or the lower right.

The laser beam LL may be scanned on different lines of the display surface 91*a* in the odd-number frame and the even-number frame.

A change with time of the deflecting angle of the movable plate 411*a* and a change with time of the deflecting angle of the movable plate 421*a* in the rendering of an image are as explained below.

In the horizontal scanning, as shown in FIG. 8, the deflecting angle of the movable plate 411*a* gradually increases from a minimum deflecting angle, after reaching a maximum deflecting angle, gradually decreases, and, after reaching the minimum deflecting angle, gradually increases again. Thereafter, the deflecting angle repeats the increase and the decrease in the same manner. In this way, in the projector 2*a*, the deflecting angle of the movable plate 411*a* does not suddenly change. Therefore, it is possible to easily and surely adjust the deflecting angle of the movable plate 411*a* of the optical scanner 41 caused to operate making use of resonance.

In the vertical scanning, as shown in FIG. 9, the deflecting angle of the movable plate 421*a* gradually increases from a minimum deflecting angle, after reaching a maximum deflecting angle, gradually decrease, and, after reaching the minimum deflecting angle, gradually increases again. Thereafter, the deflecting angle repeats the increase and the decrease in the same manner. In this way, in the projector 2*a*, the deflecting angle of the movable plate 421*a* does not suddenly change. Therefore, it is possible to easily and surely adjust the deflecting angle of the movable plate 421*a* of the optical scanner 42. A non-display period (non-rendering period) in which rendering of an image is not performed is provided between a display period (a rendering period) in which rendering of an image is performed in the odd-number frame (the forward path of the scanning in the vertical direction) and a display period in which rendering of an image is performed in the even-number frame (the backward path of the scanning in the vertical direction). In this non-display period, it is possible to adjust timings such as timing for starting rendering in the next frame.

Rendering of an image is performed in both the forward path and the backward path of the scanning in the vertical direction, i.e., when the movable plate 421*a* is pivoted in the predetermined direction and when the movable plate 421*a* is pivoted in the direction opposite to the predetermined direction. Therefore, a vertical blanking period in the past is unnecessary and the non-display period can be reduced. This makes it possible to increase the time aperture ratio (a ratio of a period in which rendering of an image is performed).

In other words, it is possible to reduce the non-display period in the vertical direction in one frame by performing the reciprocating rendering. Consequently, the time aperture ratio in the vertical scanning increases. When the angular velocity (speed) of the movable plate 411*a* is the same as that in performing the horizontal scanning only in the forward path of the vertical scanning to render an image, it is possible to increase the number of frames per unit time compared with that in rendering an image only in the forward path. This makes it possible to easily cope with quick movement in a moving image. In other words, when the number of frames per unit time is the same as that in performing the horizontal scanning only in the forward path in the vertical direction to render an image, it is possible to reduce the angular velocity of the movable plate 411a compared with that in rendering an image only in the forward path. This makes it possible to stably render an image. In the above case, when the angular velocity of the movable plate 411a is not changed, rendering with higher vertical resolution is possible.

Actually, for example, in some case, inertia (inertia moment) of the movable plates 411a and 421a of the optical scanners 41 and 42 is large and the movable plates 411a and 421a do not instantaneously follow the optical scanners 41 and 42. In such a case, in some case, driving current for the optical scanners 41 and 42 is set to zero or the optical scanners 41 and 42 are driven in the opposite phase (braking).

As explained above, with the projector 2a, it is possible to prevent keystone distortion of an image with the distortion correcting section 5 without suddenly changing the deflecting angle of the movable plates 411a and 421a while increasing the time aperture ratio.

The horizontal scanning is performed to render an image in each of the forward path and the backward path of the vertical scanning. Therefore, it is unnecessary to suddenly change the deflecting angle of the movable plate 421a when the forward path is switched to the backward path in the vertical scanning and when the backward path is switched to the forward path. This makes it possible to easily and surely adjust the deflecting angle of the movable plate 421a.

Modification of the Operation of the Projector

A modification of the projector 2a is explained with reference to FIG. 10.

In the projector 2a shown in FIGS. 10A and 10B, the deflecting width of the laser beam LL is not fixed along the vertical direction in the light emission state. However, the projector 2a adjusts the deflection angle of the movable plate 411a such that the deflecting width in the horizontal direction of the laser beam LL is the same along the vertical direction in the light emission state compared with a case in which adjustment of the movable plate 411a is not performed. Consequently, the width on the upper side of a renderable region 912a in which an image can be rendered decreases, the shape of the renderable region 912a is set close to a rectangle (including a square), and a non-rendering region can be reduced.

In the projector 2a, a rectangular rendering region 911a is set on the display surface 91a, i.e., in the renderable region 912a. The driving of the light source unit 3 is controlled such that the laser beam LL emitted from the light source unit 3 is projected (irradiated) in the rendering region 911a. This makes it possible to prevent keystone distortion of an image.

The configuration of the projectors 2a and 2b explained above is relatively simple because the optical scanners 41 and 42 (the light scanning section 4) are used. Since the laser beam is used, the projectors 2a and 2b are focus-free and can perform near projection and adjust a projection position to an arbitrary position without being limited by a setting position. If the laser beam is used, an optical system such as a lens for converting the laser beam into parallel rays can be omitted or simplified. Therefore, it is possible to realize a reduction in size of the image forming apparatus 1 as well as a reduction in size of the light source unit 3 (the light emitting section).

Such projectors 2a and 2b are provided near the screens 9a and 9b and display (render) images on the display surfaces 91a and 91b with near projection. This makes it possible to reduce optical path length of the laser beams LL emitted from the projectors 2a and 2b. Therefore, it is possible to display a denser image (a high-pixel image). Further, it is possible to more surely scan the laser beams LL in desired positions of the display surfaces 91a and 91b and prevent the laser beam LL emitted from the projector 2a from being blocked by pedestrians or the like. Therefore, it is possible to display desired images respectively on the display surfaces 91a and 91b without being affected by the peripheral environment (population density, etc.).

In this embodiment, both the projectors 2a and 2b are housed in the housing 11 and provided in positions relatively close to each other. However, the projectors 2a and 2b may be provided to be substantially spaced apart from each other. The arrangement of the projectors 2a and 2b is not specifically limited. For example, the projectors 2a and 2b may be arranged in positions distant from the screens 9a and 9b (i.e., do not have to perform near projection).

The display surface 91a as the first display section and the display surface 91b as the second section are set not to overlap each other. Consequently, since the display surface 91a and the display surface 91b are individually recognized as regions, it is possible to cause people to easily recognize the presence of an image.

In this embodiment, the display surface 91a and the display surface 91b are spaced apart from each other. However, the display surface 91a and the display surface 91b may be set in contact with each other. A part of the display surface 91a and a part of the display surface 91b may overlap each other.

In this embodiment, as explained above, the screens 9a and 9b are set on the floor surface F1 of the floor F. However, the projector 2a is set on the wall surface W1 of the wall W orthogonal to the floor F.

In other words, the floor surface F1 (the first surface) and the wall surface W1 (the second surface) are orthogonal to each other, the display surface 91a (the first display section) and the display surface 91b (the second display section) are set on the floor surface F1 (the same plane), and the projectors 2a and 2b are set on the wall surface W1.

This makes it possible to reduce optical path length of light emitted from the projectors 2a and 2b compared with a case in which the projectors 2a and 2b are provided on one of two surfaces (e.g., a floor surface and a ceiling surface) parallel to each other and the display surfaces 91a and 91b are set on the other. Therefore, it is possible to prevent or suppress the light emitted from the projectors 2a and 2b from being blocked by pedestrians or the like. As a result, it is possible to display desired images respectively on the display surfaces 91a and 91b without being affected by the peripheral environment (population density, etc.). Since the setting surface of the projectors 2a and 2b is the wall surface W1, it is possible to prevent or suppress the projectors 2a and 2b from obstructing, for example, walking of pedestrians.

Since the projectors 2a and 2b are set on the wall surface W1 and the display sections 91a and 91b are set on the floor surface F1, it is possible to cause people present around the image forming apparatus 1 to easily recognize the presence of an image on the inside or the outside of a building. Therefore, for example, when an image for advertisement such as a commercial or promotion video is used as a displayed image, the image forming apparatus 1 can show an excellent advertisement function.

The clearance between the display section 91a and the projector 2a and the clearance between the display section

91*b* and the projector 2*b* are the same. This makes it possible to relatively easily correct distortion of images on the display section 91*a* and the display section 91*b*. The clearances may be different from each other.

Human Sensor

As shown in FIG. 2, the human sensor (the moving object detection sensor) 7 includes a sensor section 71, a storing section 72, and a determining section 73. Such a human sensor 7 has a function of detecting whether a person (a moving object) is present in each of a first detection region S1 and a second detection region S2. Such a human sensor 7 is housed in the housing 11 (however, for example, a part of the sensor section 71 may be exposed from the housing 11 such that a function of the sensor section 71 can be shown) and provided near the screens 9*a* and 9*b*. In this embodiment, the human sensor 7 is housed in the housing 11. However, the invention is not limited to this. The human sensor 7 may be provided separately from the housing 11.

The sensor section 71 can detect presence or absence of a person near the sensor section 71 and can measure the clearance between the sensor section 71 and the detected person and the direction of the person. The sensor section 71 is not specifically limited as long as the function explained above can be shown. For example, an infrared ray sensor that makes use of an infrared ray and an ultrasonic sensor that makes use of ultrasound can be used. A sensor obtained by combining the infrared ray sensor and the ultrasonic sensor can also be used.

The infrared ray sensor is a sensor that detects, when an object (a person) having a temperature difference from the atmospheric temperature moves into a detection area, a temperature change in the detection area using an infrared ray to thereby detect presence or absence of a person near the sensor section 71 and a distance to the person. On the other hand, the ultrasonic sensor is a sensor that transmits ultrasound with an echo sounder transmitter, receives a reflected wave with an acoustic receiver, and calculates a relation between time required from the transmission to the reception and sound speed to thereby detect presence or absence of a person near the sensor section 71 and a distance to the person.

Among these sensors, a single sensor having directivity is used or plural sensors having directivity are used in combination, whereby it is possible to detect only a person present in a region in a specific direction from the sensor section 71.

The first detection region S1 and the second detection region S2 as regions in which presence or absence of a person is determined are set in the storing section 72.

As shown in FIG. 11, the first detection region S1 is set to include the screen 9*a* (the display surface 91*a*) when viewed from a vertical line direction (above). Since the first detection region S1 is set to include the screen 9*a* in this way, it is possible to surely detect the presence of a person near the screen 9*a* without overlooking the person.

The first detection region S1 is formed in, when viewed from above in the vertical direction, a fan shape extending to a predetermined distance from the sensor section 71 to the display section 91*a* while expanding at a predetermined spread angle. This makes it possible to detect only a person present near the display surface 91*a*.

The shape and the size of the first detection region S1 are determined according to conditions such as setting positions of the projectors 2*a* and 2*b* and the screens 9*a* and 9*b* and content and the size of a displayed image and are not specifically limited. For example, the shape of the first detection region S1 may be a semicircular shape with the sensor section 71 set as the sensor, may be a polygonal shape such as a rectangle or a square, or may be a shape with the center portion of the display surface 91*a* of the screen 9*a* set as the center.

The size (a radius SR1) of such a first detection region S1 is desirably size enough for a person present in a most distant position from the screen 9*a* in the first detection region S1 to recognize (identify) image content displayed on the display surface 91*a*. Consequently, all people present in the first detection region S1 can recognize content of an image displayed on the display surface 91*a*. The "size enough for a person to identify content of an image" means that, for example, when the image displayed on the display surface 91*a* is a human face, it is sufficient that sex, approximate age, and the like can be discriminated and, when the image displayed on the display surface 91*a* is a character, it is sufficient that the character can be recognized.

The second detection region S2 is set to include the screen 9*b* (the display surface 91*b*) when viewed from above in the vertical line direction. Since the second detection region S2 is set to include the screen 9*b*, it is possible to surely detect the presence of a person near the screen 9*b* without overlooking the person.

The second detection region S2 is set not to overlap the first detection region S1. This makes it possible to easily and surely detect a person present near the display surface 91*a* and a person present near the display surface 91*b* independently from each other.

In this embodiment, the second detection region S2 has shape and size same as those of the first detection region S1. This makes it possible to detect a person H with the same processing when the person H is present near the display surface 91*a* and when the person H is present near the display surface 91*b*. Therefore, it is possible to realize simplification of the configuration of the human sensor 7 and simply, surely, and appropriately switch the first state and the second state.

The shape and the size of the second detection region S2 are also determined according to conditions such as setting positions of the projectors 2*a* and 2*b* and the screens 9*a* and 9*b* and content and the size of a displayed image and are not specifically limited. For example, the shape of the second detection region S2 may be a semicircular shape with the sensor section 71 set as the center, may be a polygonal shape such as a rectangle or a square, or may be a shape with the center portion of the display surface 91*a* of the screen 9*a* set as the center. The shape and the size of the second detection region S2 may be respectively different from those of the first detection region S1.

The size (a radius SR2) of such a second detection region S2 is desirably size enough for a person present in a most distant position from the screen 9*b* in the second detection region S2 to recognize (identify) image content displayed on the display surface 91*b*. Consequently, all people present in the second detection region S2 can recognize content of an image displayed on the display surface 91*b*.

When the sensor section 71 detects the presence of a person, the determining section 73 determines, on the basis of the clearance between the person and the sensor section 71 (hereinafter simply referred to as "clearance D") and the direction of a segment connecting the sensor section 71 and the person (hereinafter simply referred to as "direction"), in which of the first detection region S1 and the second detection region S2 stored in the storing section 72 the person is located. The determining section 73 transmits a result of the determination to the control section 8. Such determination by the determining section 73 may be performed on a real time basis (continuously) or may be performed intermittently.

Specifically, the radius SR1 and the direction of the first detection region S1 and the radius SR2 and the direction of the outer circumference of the second detection region S2 are stored in the storing section 72. If the clearance D is smaller than the radius SR1 and the direction is within a predetermined first range, the determining section 73 determines that the person is located in the first detection region S1. If the clearance D is smaller than the radius SR2 and the direction is within a predetermined second range different from the first range, the determining section 73 determines that the person is located in the second detection region S2. In this embodiment, since the sensor section 71 is provided near the screens 9a and 9b, the clearance D can be regarded as the clearance between the screens 9a and 9b (the centers of the display surfaces 91a and 91b) and the person. Therefore, with the determining method explained above, it is possible to more accurately determine in which of the first detection region S1 and the second detection region S2 the person is located.

The human sensor 7 is explained above. The configuration of the human sensor 7 is not limited to the configuration explained above. For example, as the sensor section 71, a sensor that cannot measure the clearance between the sensor and a detected person may be used. In this case, for example, a first sensor and a second sensor having directivity are prepared. A detection region of the first sensor is set to include the display section 91a and set as the first detection region S1. A detection region of the second sensor is set to include the display section 91b and set as the second detection region S2. This makes it possible to determine, when the first sensor detects the presence of a person, that the person is present in the first detection region S1 and determine, when the second sensor detects the presence of a person, that the person is present in the second detection region S2. In this case, the storing section 72 can be omitted.

For example, as the sensor section 71, one or plural first pressure sensors set under the floor of the first detection region S1 and one or plural second pressure sensors set under the floor of the second detection region S2 may be used. In this case, the sensor section 71 only has to determine, if the first pressure sensors react, that a person is located in the first detection region S1 and determine, if the second pressure sensors react, that a person is located in the second detection region S2. In this case, as in the case explained above, the storing section 72 can be omitted.

The sensor section 71 is not limited to one sensor section 71 in this embodiment. Two or more sensor sections 71 may be arranged. This is advantageous when the entire region of the first detection region S1 and the second detection region S2 cannot be covered by the one sensor section 71.

Control Section

The control section 8 controls the driving of the projectors 2a and 2b on the basis of a detection result of the human sensor 7. Specifically, the control section 8 controls the driving of plural projectors (the first projector 2a and the second projector 2b) such that a position where an image is displayed is changed.

In particular, the control section (a switching section) 8 has a function (capability) for switching, on the basis of a detection result of the human sensor 7, at least two states among a first state in which the projector 2a displays an image on the display surface 91a and the projector 2b does not display an image on the display surface 91b, a second state in which the projector 2a does not display an image on the display surface 91a and the projector 2b displays an image on the display surface 91b, a third state in which the projector 2a does not display an image on the display surface 91a and the projector 2b does not display an image on the display surface 91b, and a fourth state in which the projector 2a displays an image on the display surface 91a and the projector 2b displays an image on the display surface 91b.

Specifically, the control section 8 switches, on the basis of whether a person is present in each of the first detection region S1 and the second detection region S2, at least two states among a first state in which an image is displayed on the display surface 91a as shown in FIG. 12A (hereinafter simply referred to as "first state"), a second state in which an image is displayed on the display surface 91b as shown in FIG. 12B (hereinafter simply referred to as "second state"), a third state in which images are displayed on the display surfaces 91a and 91b as shown in FIG. 12C (hereinafter simply referred to as "third state"), and a fourth state in which no image is displayed on either of the display surfaces 91a and 91b (hereinafter simply referred to as "fourth state").

This makes it possible to switch a display position of an image according to the movement of a person. As a result, it is possible to cause the person to more easily recognize the presence of the image.

In particular, since the image forming apparatus 1 performs display of an image on the display surface 91a and display of an image on the display surface 91b using the separate projectors, it is possible to increase variations of positions where images are displayed. Therefore, it is possible to make the effect explained above (the effect of improving visibility of the presence and content of an image) more conspicuous. For example, compared with a case in which one projector is used, there is an advantage that distortion correction for images on the display surfaces 91a and 91b can be easily performed.

More specifically, when the human sensor 7 detects the presence of a person in the first detection region S1, the control section 8 switches the image forming apparatus 1 to the first state. When the human sensor 7 does not detect presence of a person in the first detection region S1, the control section 8 switches the image forming apparatus 1 to the second state. This makes it possible to cause a person present in the first detection region S1 to easily recognize the presence of an image on the display surface 91a. In particular, as explained above, since the display surface 91a is set in the first detection region S1, it is possible to cause the person present in the first detection region S1 to more easily recognize the presence of the image on the display surface 91a.

When the human sensor 7 detects the presence of a person in the second detection region S2, the control section 8 switches the image forming apparatus 1 to the second state. When the human sensor 7 does not detect presence of a person in the second detection region S2, the control section 8 switches the image forming apparatus 1 to the first state. This makes it possible to cause a person present in the second detection region S2 to easily recognize the presence of an image on the display surface 91b. In particular, as explained above, since the display surface 91b is set in the second detection region S2, it is possible to cause the person present in the second detection region S2 to more easily recognize the presence of the image on the display surface 91b.

When the human sensor 7 detects the presence of people in both the first detection region S1 and the second detection region S2, the control section 8 only has to give priority to the detection in one of the detection regions according to timing of the detection. For example, after the human sensor 7 detects the presence of a person in the first detection region S1, when the human sensor 7 detects the presence of a person in the second detection region S2, even if these detection states continue and the human sensor 7 detects the presence of people in both the first detection region S1 and the second detection region S2, the control section 8 switches the image forming apparatus 1 to the second state. Conversely, after the human sensor 7 detects the presence of a person in the second detection region S2, when the human sensor 7 detects the presence of a person in the first detection region S1, even if these detection states continue and the human sensor 7 detects the presence of people in both the first detection region S1 and the second detection region S2, the control section 8 switches the image forming apparatus 1 to the first state.

When the human sensor 7 detects the presence of a person in both the first detection region S1 and the second detection region S2, the control section 8 may switch the image forming apparatus 1 to the fourth state without giving priority to detection in one of the detection regions or may switch at least two states among the first state, the second state, and the fourth state at a predetermined time interval. The control section 8 may perform such switching to the fourth state and switching at the predetermined time interval only when a state in which the human sensor 7 detects the presence of a person in both the first detection region 51 and the second detection region S2 is maintained for time equal to or longer than the predetermined time.

When the human sensor 7 does not detect the presence of a person in both the first detection region 51 and the second detection region S2, the control section 8 may switch the image forming apparatus 1 to any one of the first state, the second state, and the fourth state or may switch at least two states of the first state, the second state, and the fourth state at a predetermined time interval. When the control section 8 switches the states at the predetermined time interval, the control section 8 may perform the switching only when a state in which the human sensor 7 does not detect the presence of a person in both the first detection region S1 and the second detection region S2 is maintained for time equal to or longer than the predetermined time.

The control section 8 can control the driving of the projectors 2a and 2b such that an image is not displayed on both the display surfaces 91a and 91b (the image forming apparatus 1 is switched to the third state) when the state in which the human sensor 7 does not detect the presence of a person in both the first detection region S1 and the second detection region S2 is maintained for the time equal to or longer than the predetermined time. In other words, the control section 8 controls the operation of the projectors 2a and 2b such that images are displayed on the display surfaces 91a and 91b only when the human sensor 7 detects the presence of a person in the first detection region S1 or the second detection region S2.

With such control, it is possible to prevent useless driving of the projectors 2a and 2b for displaying images on the display surfaces 91a and 91b regardless of the fact that a person who is likely to recognize images displayed on the display surfaces 91a and 91b is not present. In other words, it is possible to realize power saving driving of the image forming apparatus 1 and realize extension of the life of the projectors 2a and 2b by eliminating the useless driving of the projectors 2a and 2b.

For example, the human sensor 7 detects the presence of a person who enters the first detection region S1 or the second detection region S2 and images are displayed on the display surfaces 91a and 91, it is likely that the person is interested in the images suddenly displayed on the display surfaces 91a and 91b and stares at the images displayed on the display surfaces 91a and 91b. Therefore, by performing the control explained above, it is possible to make a person passing near the screens 9a and 9b interested in the images displayed on the display surfaces 91a and 91b. For example, when the images are advertisement such as a commercial or promotion video, it is possible to show an excellent advertisement effect.

The control section 8 may perform the switching of the first state and the second state on the basis of whether a person is present in the first detection region S1. In this case, when a person is present in the first detection region S1, the control section 8 only has to switch the image forming apparatus 1 to the first state. When no person is present in the first detection region S1, the control section 8 only has to switch the image forming apparatus 1 to the second state.

Similarly, the control section 8 may perform the switching of the first state and the second state on the basis of whether a person is present in the second detection region S2. In this case, when a person is present in the second detection region S2, the control section 8 only has to switch the image forming apparatus 1 to the second state. When no person is present in the second detection region S2, the control section 8 only has to switch the image forming apparatus 1 to the first state.

When the control section 8 switches the projectors 2a and 2b to the first state and the second state on the basis of only whether a person is present one of the first detection region S1 and the second detection region S2 in this way, it is also possible to switch a display position of an image according to the movement of a person. As a result, it is possible to cause the person to more easily recognize the presence of the image. It is possible to display images on the display surfaces 91a and 91b only when necessary. As a result, it is possible to realize power saving.

With the image forming apparatus 1 according to this embodiment explained above, by changing a position where an image is displayed, even if areas of the display surfaces 91a and 91b are relatively small, it is possible to cause a person present around the image forming apparatus 1 to easily recognize the presence of the image.

It is possible to improve expression power by the image by changing the position where the image is displayed.

In particular, since the image forming apparatus 1 performs display of an image on the display surface 91a and display of an image on the display surface 91b using the separate projectors, it is possible to increase variations of positions where images are displayed. Therefore, it is possible to make the effect explained above (the effect of improving visibility of the presence and content of an image) more conspicuous.

Consequently, even if a displayed image is small, the image forming apparatus 1 can cause a person to easily recognize the presence of the image and can improve expression power by the image.

Second Embodiment

A second embodiment of the image forming apparatus according to the invention is explained below.

Figure 13:
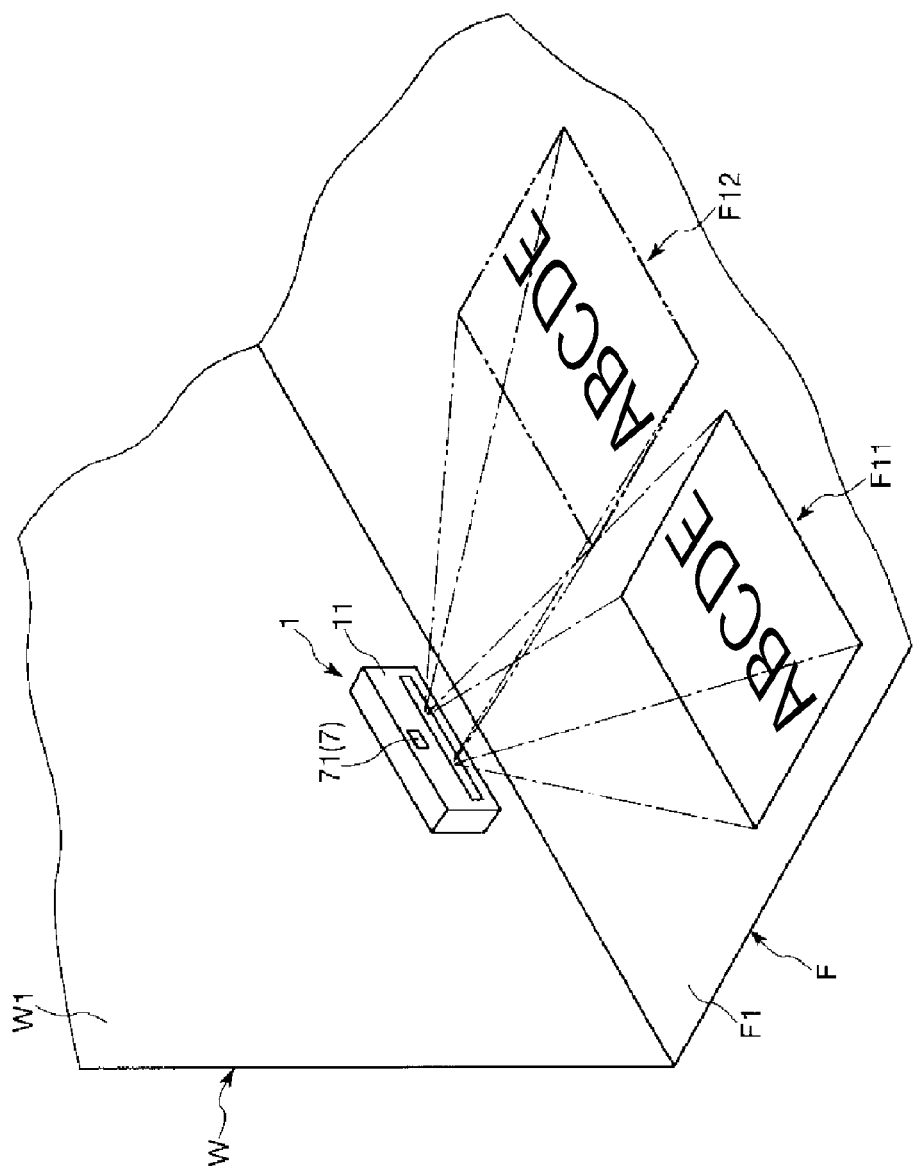
FIG. 13 is a diagram showing a second embodiment of the image forming apparatus according to the invention.

FIG. 13 is a diagram showing the second embodiment of the image forming apparatus according to the invention.

In the following explanation, concerning the image forming apparatus according to the second embodiment, differences from the first embodiment are mainly explained. Explanation of matters same as those in the first embodiment is omitted.

The image forming apparatus according to the second embodiment is substantially the same as the image forming apparatus according to the first embodiment except that the screens are not provided. In FIG. 13, components same as those in the first embodiment are denoted by the same reference numerals and signs.

As shown in FIG. 13, the image forming apparatus 1 selectively displays image in a display area (a first display section)

F11 set on the floor surface F1 of the floor F and a display area (a second display section) F12 set in a position different from the position of the display area F11 on the floor surface F1.

Since an image is directly displayed on the floor surface F1 in this way, it is unnecessary to arrange the screens unlike the first embodiment. Therefore, it is possible to realize a reduction in cost. Further, since an image can be displayed anywhere on the floor surface F1, convenience of the image forming apparatus is improved.

According to the second embodiment, it is possible to realize effects same as those in the first embodiment.

Third Embodiment

Figure 14:
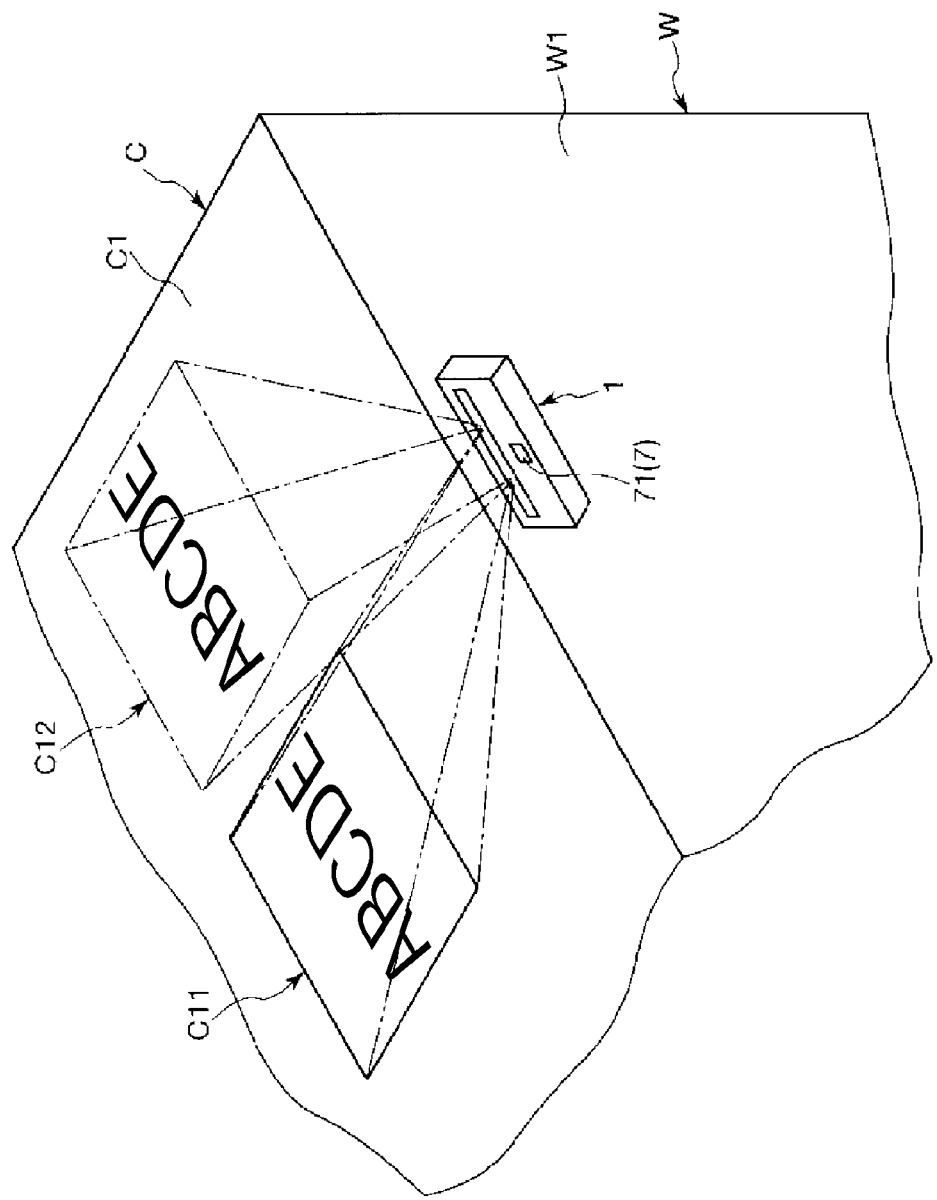
FIG. 14 is a diagram showing a third embodiment of the image forming apparatus according to the invention.

FIG. 14 is a diagram showing a third embodiment of the image forming apparatus according to the invention.

In the following explanation, concerning the image forming apparatus according to the third embodiment, differences from the embodiments explained above are mainly explained. Explanation of matters same as those in the embodiments is omitted.

The image forming apparatus according to the third embodiment is substantially the same as the image forming apparatus according to the second embodiment except that the arrangement of the first display section, the second display section, and the image forming apparatus is different. In FIG. 14, components same as those in the embodiments explained above are denoted by the same reference numerals and signs.

As shown in FIG. 14, display areas C11 and C12 are provided on a ceiling surface C1 of a ceiling C. On the other hand, the image forming apparatus 1 is provided on the wall W. More specifically, the image forming apparatus 1 is provided near a boundary portion between the wall W and the ceiling C.

In this embodiment, the display areas and the image forming apparatus 1 are set to be vertically reversed from those in the second embodiment.

Such an image forming apparatus 1 selectively displays an image in the display area (the first display section) C11 set on the ceiling surface C1 and the display area (the second display section) C12 set in a position different from the position of the display area C11 of the ceiling surface C1. In an example shown in FIG. 14, an image is displayed in the display areas C11 and C12 with the bottom of the image set on the image forming apparatus 1 side.

In this embodiment, optical paths of the laser beams LL emitted from the projectors 2a and 2b can be set to avoid a region where people pass. Therefore, it is possible to surely prevent the laser beams LL emitted from the projectors 2a and 2b from being blocked by pedestrians or the like.

According to the third embodiment, it is possible to realize effects same as those in the first embodiment.

Fourth Embodiment

A fourth embodiment of the image forming apparatus according to the invention is explained below.

Figure 15:
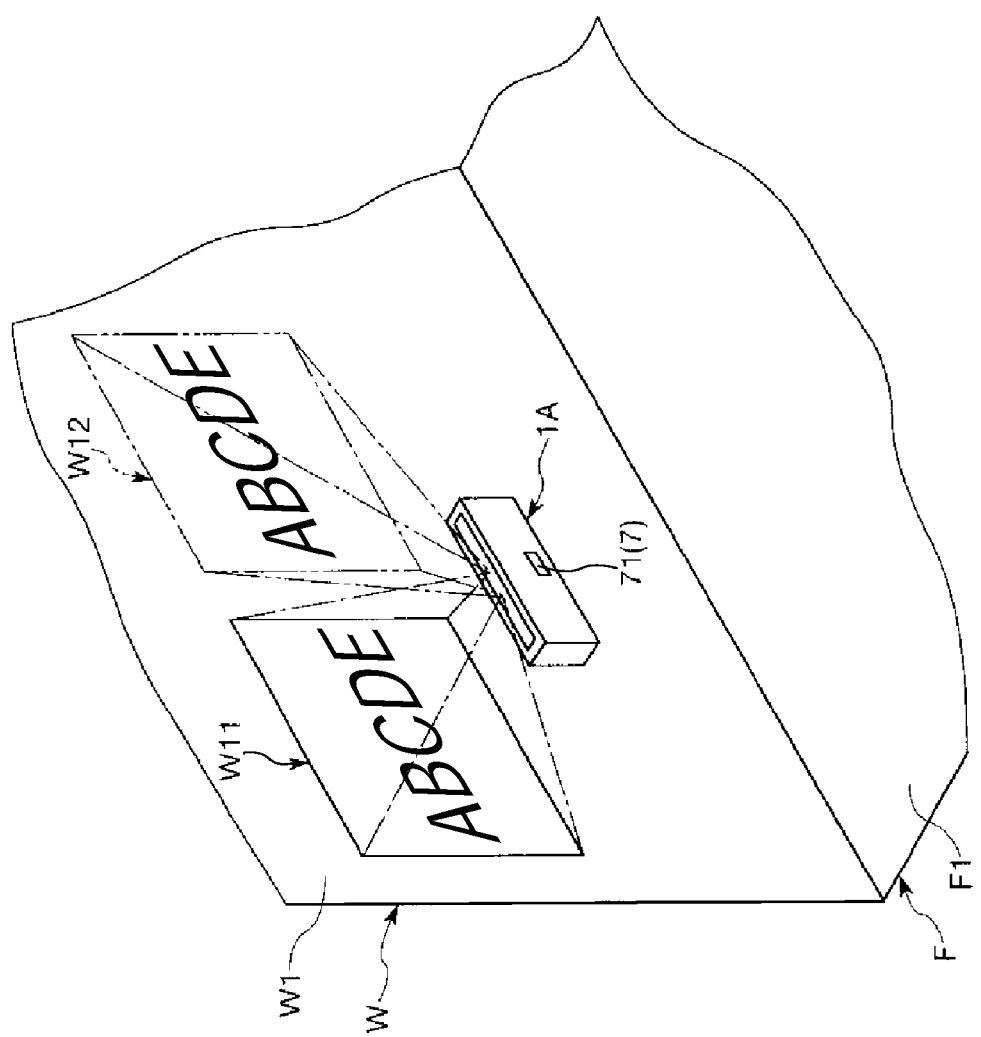
FIG. 15 is a diagram showing a fourth embodiment of the image forming apparatus according to the invention.

FIG. 15 is a diagram showing the fourth embodiment of the image forming apparatus according to the invention.

In the following explanation, concerning the image forming apparatus according to the fourth embodiment, differences from the embodiments explained above are mainly explained. Explanation of matters same as those in the embodiments is omitted.

The image forming apparatus according to the forth embodiment is substantially the same as the image forming apparatus according to the first embodiment except that the arrangement of the first display section, the second display section, and the image forming apparatus is different. In FIG. 15, components same as those in the embodiments explained above are denoted by the same reference numerals and signs.

As shown in FIG. 15, an image forming apparatus 1A selectively displays an image in a display area (the first display section) W11 set on the wall surface W1 of the wall W and a display area (the second display section) W12 set in a position different from the position of the display area W11 on the wall surface W1.

The image forming apparatus 1A is set on the wall surface W1. In other word, the image forming apparatus 1A is set on the same plane as the display areas W11 and W12.

With such arrangement, it is possible to reduce optical path length of light emitted from the projectors 2a and 2b compared with a case in which the projectors 2a and 2b are set on one of two surfaces parallel to each other and the display surfaces 91a and 91b are set on the other. Therefore, it is possible to prevent or suppress the light emitted from the projectors 2a and 2b from being blocked by pedestrians or the like. In particular, since the light emitted from the projectors 2a and 2b is along the wall surface W1 (the first surface), it is possible to more surely prevent or suppress the light from being blocked by pedestrians or the like.

The image forming apparatus 1A is provided on the lower side in the vertical direction of the display areas W11 and W12. The image forming apparatus 1A scans the laser beam LL upward to display (render) images in the display areas W11 and W12. Since the projectors 2a and 2b are arranged on the lower side of the display areas W11 and W12 in this way, it is easy to adjust an amount of external light radiated on the display areas W11 and W12.

According to the fourth embodiment, it is possible to realize effects same as those in the first embodiment.

Fifth Embodiment

A fifth embodiment of the image forming apparatus according to the invention is explained below.

Figure 16:
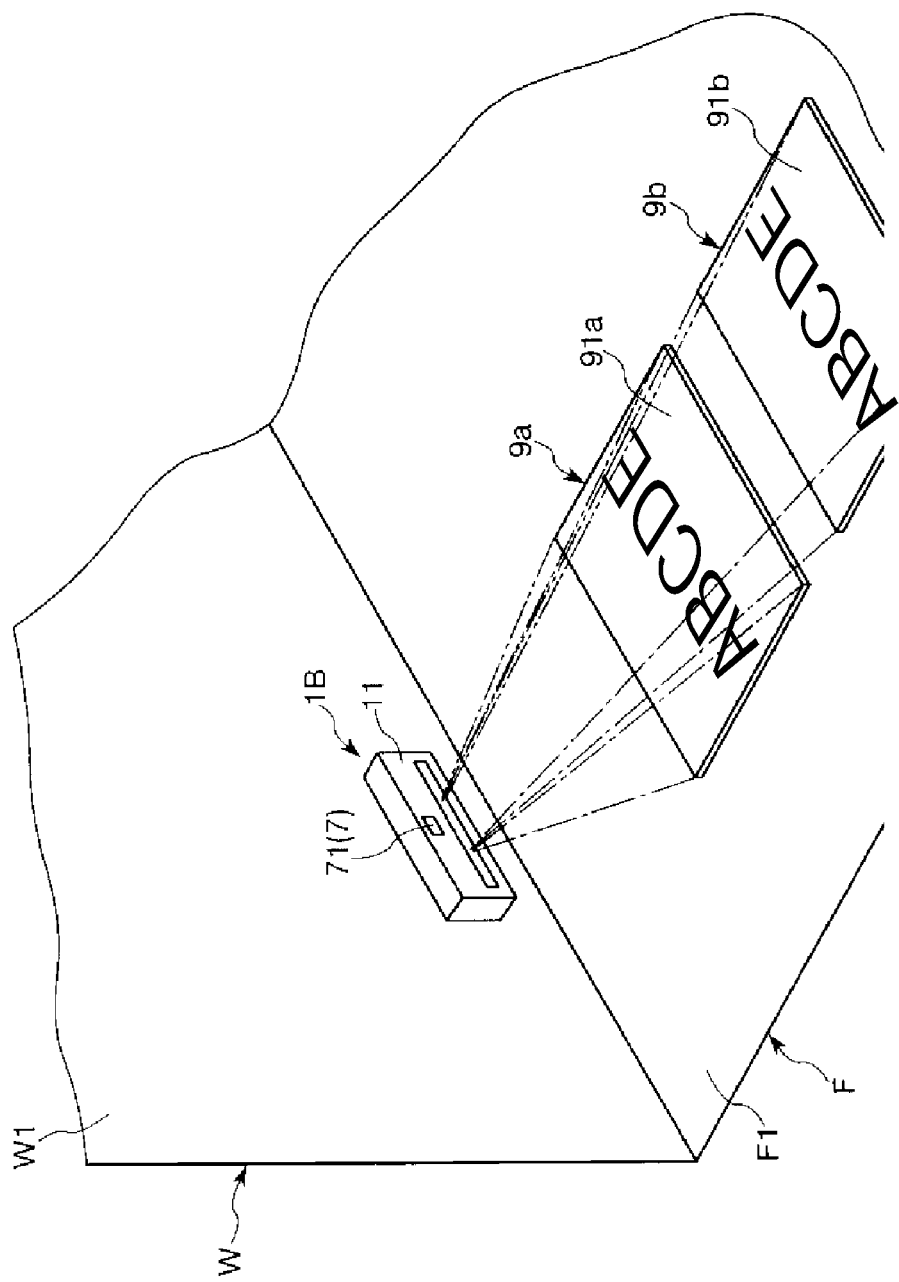
FIG. 16 is a diagram showing a fifth embodiment of the image forming apparatus according to the invention.
Figure 17:
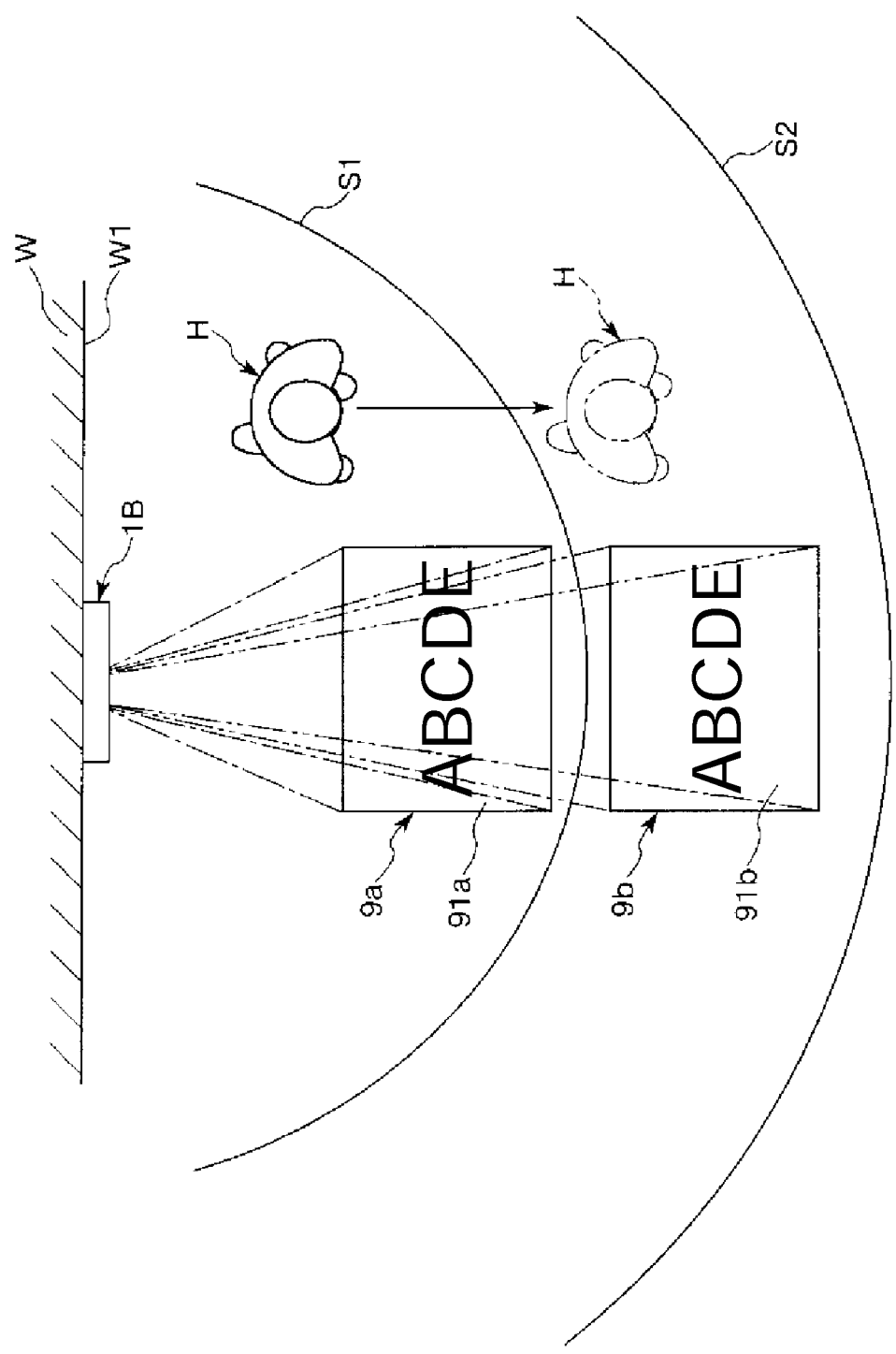
FIG. 17 is a top view showing a detection region of a human sensor (a moving object detection sensor) in the image forming apparatus shown in FIG. 16.

FIG. 16 is a diagram showing the fifth embodiment of the image forming apparatus according to the invention. FIG. 17 is a top view showing a detection region of a human sensor (a moving body detection sensor) in the image forming apparatus shown in FIG. 16.

In the following explanation, concerning the image forming apparatus according to the fifth embodiment, differences from the first embodiment are mainly explained. Explanation of matters same as those in the first embodiment is omitted.

The image forming apparatus according to the fifth embodiment is substantially the same as the image forming apparatus according to the first embodiment except that the arrangement of the image forming apparatus and the screens is different. In FIG. 16, components same as those in the embodiments explained above are denoted by the same reference numerals and signs.

In this embodiment, an image forming apparatus 1B is set on the wall surface W1 and the screens 9a and 9b are set on the floor surface F1. However, in plan view of the display surface 91a of the screen 9a, the display surface 91b of the screen 9b is located on a segment passing the image forming apparatus 1B (a projector and the display surface 91a (a segment connecting sections of the projectors 2a and 2b where the light LL is emitted and the center of the display surface 91a). This makes it possible to relatively easily correct distortion of the display surfaces 91a and 91b.

In such a case, in the first embodiment, it is possible to selectively display an image on the display surfaces 91a and 91b by changing a center position of a scanning range in the vertical direction of the light scanning section 4. More specifically, it is possible to selectively display an image on the display surfaces 91a and 91b by changing a center position of amplitude of the movable plate 421 of the optical scanner 42.

In this embodiment, as shown in FIG. 17, when viewed from the vertical direction, the first detection region S1 is set to include the display surface 91a and the second detection region S2 is set to include the display surface 91b.

Each of the first detection region S1 and the second detection region S2 is formed in a semicircular shape with the sensor section 71 set as the center when viewed from the vertical direction.

The size (the radius) of the second detection region S2 is larger than the size of the first detection region S1.

In this embodiment, when the sensor section 71 detects a person, the determining section 73 determines, on the basis of a clearance between the person and the sensor section 71 (hereinafter also simply referred to as "clearance D"), in which of the first detection region S1 and the second detection region S2 stored in the storing section 72 the person is located.

According to the fifth embodiment, it is possible to realize effects same as those in the first embodiment.

Sixth Embodiment

A sixth embodiment of the image forming apparatus according to the invention is explained below.

Figure 18:
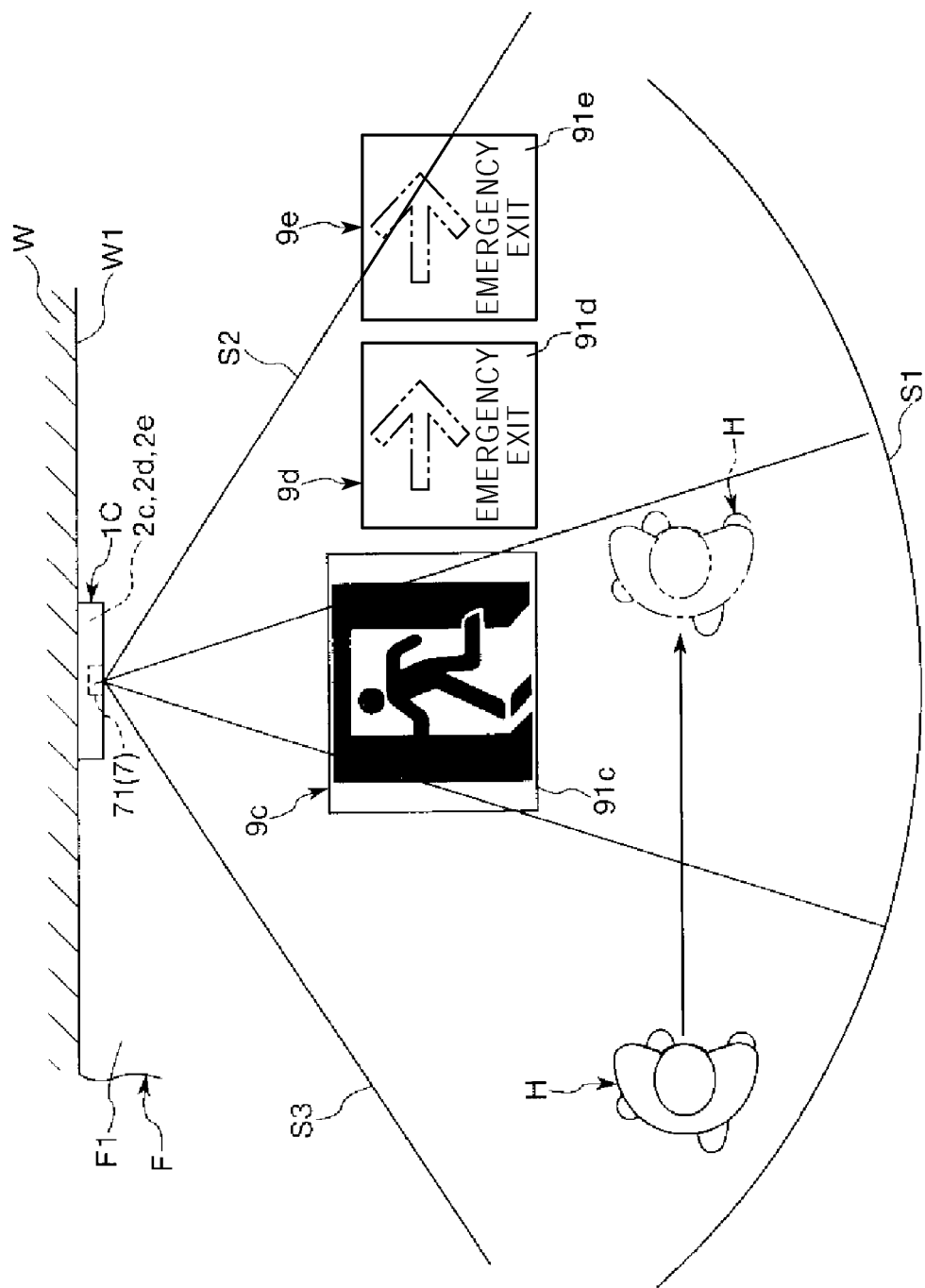
FIG. 18 is a diagram showing a sixth embodiment of the image forming apparatus according to the invention.

FIG. 18 is a diagram showing the sixth embodiment of the image forming apparatus according to the invention.

In the following explanation, concerning the image forming apparatus according to the sixth embodiment, differences from the first embodiment are mainly explained. Explanation of matters same as those in the first embodiment is omitted.

The image forming apparatus according to the sixth embodiment is substantially the same as the image forming apparatus according to the first embodiment except that the number and the arrangement of the screens are different. In FIG. 18, components same as those in the embodiments explained above are denoted by the same reference numerals and signs.

As shown in FIG. 18, an image forming apparatus 1C is set on the wall surface W1 of the wall W and three screens 9c, 9d, and 9e are set on the floor surface F1 of the floor F.

The three screens 9c, 9d, and 9e are provided side by side along the wall surface W1 while being spaced from one another. In FIG. 18, the screen 9c, the screen 9d, and the screen 9e are provided side by side in this order from the left side to the right side in the figure.

The image forming apparatus 1C includes a projector 2c as a first projector that displays an image on a display surface 91c (a first display section) of the screen 9c, a projector 2d as a second projector that displays an image on a display surface 91d (a second display section) of the screen 9d, and a projector 2e as a third projector that displays an image on a display surface 91e (a third display section) of the screen 9e.

A not-shown control section (switching section) provided in the image forming apparatus 1C can switch a state in which the projector 2c displays an image on the display surface 91e and a state in which the projector 2c does not display an image on the display surface 91e in each of a first state, a second state, a third state, and a fourth state. This makes it possible to switch display of images on the three display surfaces 91c, 91d, and 91e.

In this embodiment, the control section can selectively switch the first state in which the first projector displays an image on the screen 9c, the second state in which the second projector displays an image on the screen 9d, and the third state in which the third projector displays an image on the screen 9e. The configuration of the projectors is the same as that of the projector 2a in the first embodiment.

In this embodiment, the detection sensor 7 can detect presence or absence of a person in each of the three detection regions S1, S2, and S3.

Each of the detection regions S1, S2, and S3 is formed in a fan shape with the sensor section 71 set as the center. The detection regions S1, S2, and S3 are provided side by side in order of the detection region S3, the detection region S1, and the detection region S2 from the left side to the right side in FIG. 18. The detection regions S1, S2, and S3 are provided to be set in contact with the detection regions adjacent to one another.

The detection region (the first detection region) S1 is set to pass over the screen 9c from the sensor section 71 when viewed from above in the vertical direction.

The detection region (the second detection region) S2 is set to be adjacent on the right side in FIG. 18 of the detection region S1 and pass over the screen 9d from the sensor section 71.

The detection region (the third detection region) S3 is provided to be adjacent on the opposite side of the detection region S2 with respect to the detection region S1 when viewed from above in the vertical direction.

The detection sensor 7 detects presence or absence of people in the detection regions S1, S2, and S3. The control section selectively switches, on the basis of a result of the detection, the first state in which an image is displayed on the screen 9c, the second state in which an image is displayed on the screen 9d, and the third state in which an image is displayed on the screen 9e.

In this embodiment, as shown in FIG. 18, when a person H moves from the right side to the left side in the figure, the control section switches, on the basis of a detection result of the human sensor 7, the first state, the second state, and the third state to follow the movement of the person H.

Specifically, for example, when the human sensor 7 detects the presence of a person only in the detection region S3, the control section switches the image forming apparatus 1 to the first state. This makes it possible to display an image only on the display surface 91c of the screen 9c and cause a person approaching the image forming apparatus 1 to easily recognize the presence of the image. For example, when the image displayed on the display surface 91c of the screen 9c is a pictogram of an emergency exit as in the example shown in FIG. 18, it is possible to provide a chance for guiding the person approaching the image forming apparatus 1 to the emergency exit.

When the human sensor 7 detects the presence of a person only in the detection region S1, the control section switches the image forming apparatus 1 to the second state. This makes it possible to display an image only on the display surface 91d of the screen 9d and cause the person approaching the screen 9c according to the image display on the display surface 91c to easily recognize the image. For example, when the image displayed on the display surface 91d of the screen 9d is an arrow indicating the direction of the emergency exit as in the example shown in FIG. 18, it is possible to guide the person approaching the screen 9c to the emergency exit.

When the human sensor 7 detects the presence of a person only in the detection region S2, the control section switches the image forming apparatus 1 to the third state. This makes it possible to display an image only on the display surface 91*e* of the screen 9*e* and cause the person approaching the screen 9*d* according to the image display on the display surface 91*d* to easily recognize the image. For example, when the image displayed on the display surface 91*e* of the screen 9*e* is an arrow indicating the direction of the emergency exit as in the example shown in FIG. 18, it is possible to guide the person approaching the screen 9*d* to the emergency exit.

When the human sensor 7 simultaneously detects the presence of a person in at least two detection regions among the detection regions S1, S2, and S3, the control section may sequentially switch the first state, the second state, and the third state at a predetermined time interval or may switch the first state, the second state, and the third state in the same manner as explained above giving priority to detection at the first timing or the last timing.

When the human sensor 7 does not detect the presence of a person in all the detection regions S1, S2, and S3, the control section may sequentially switch the first state, the second state, and the third state at a predetermined time interval or may switch the image forming apparatus 1 to any one of the first state, the second state, and the third state (e.g., the first state).

The switching of the first state, the second state, and the third state is not limited to those explained above. For example, the control section may calculate moving speed of the person H on the basis of timing when the human sensor 7 detects the presence of a person only in the detection region S3 and timing when the human sensor 7 detects the presence of a person only in the detection region S1 and sequentially switch the first state, the second state, and the third state according to the moving speed.

One projector may display images on the display sections 91*c* and 91*e*. In this case, the control section only has to switch a center position of a scanning range of a light scanning section included in the projector to switch the second state and the third state.

According to the sixth embodiment, it is possible to realize effects same as those in the first embodiment.

Seventh Embodiment

A seventh embodiment of the image forming apparatus according to the invention is explained below.

Figure 19:
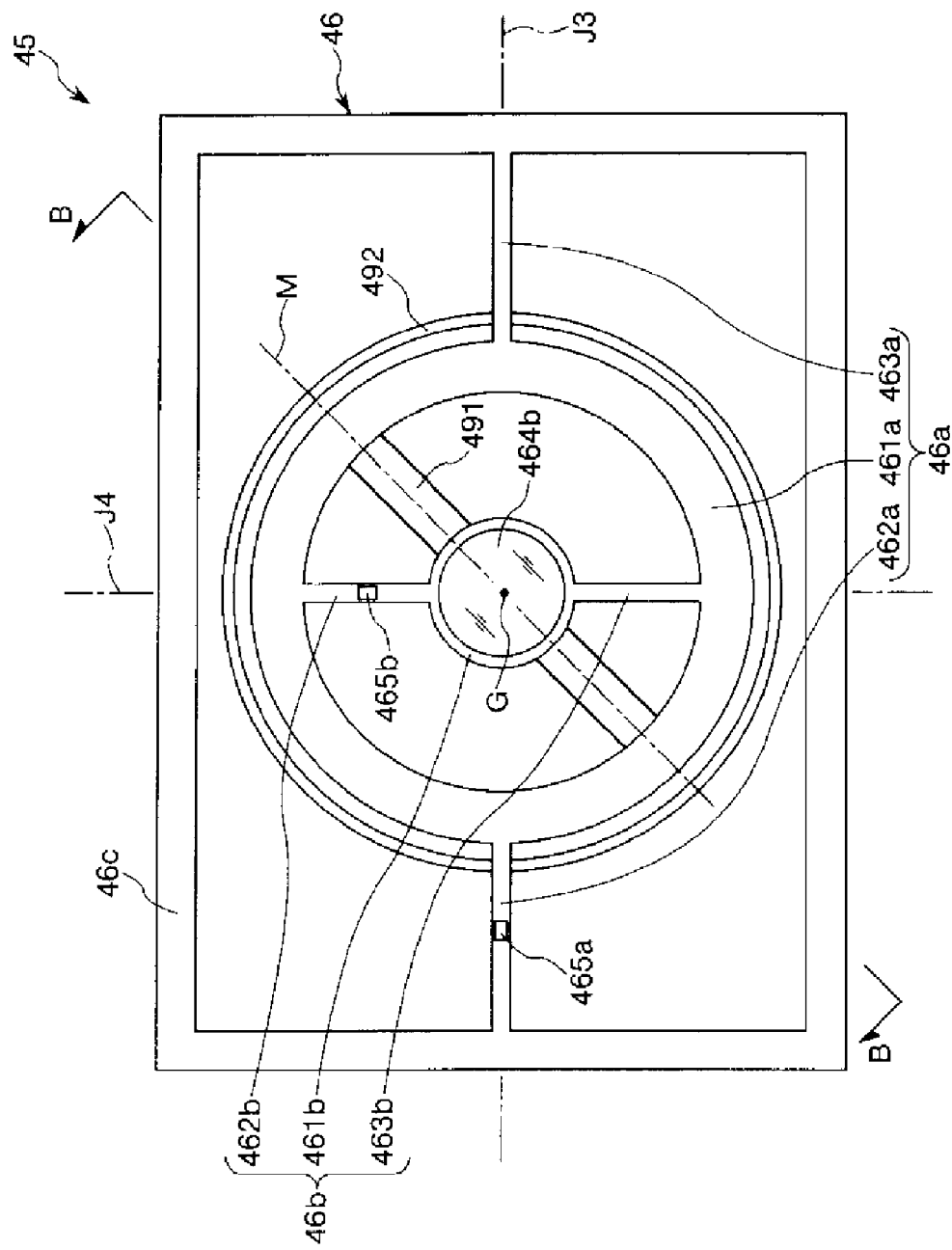
FIG. 19 is a schematic plan view showing an optical scanner of a projector included in an image forming apparatus according to a seventh embodiment of the invention.
Figure 20:
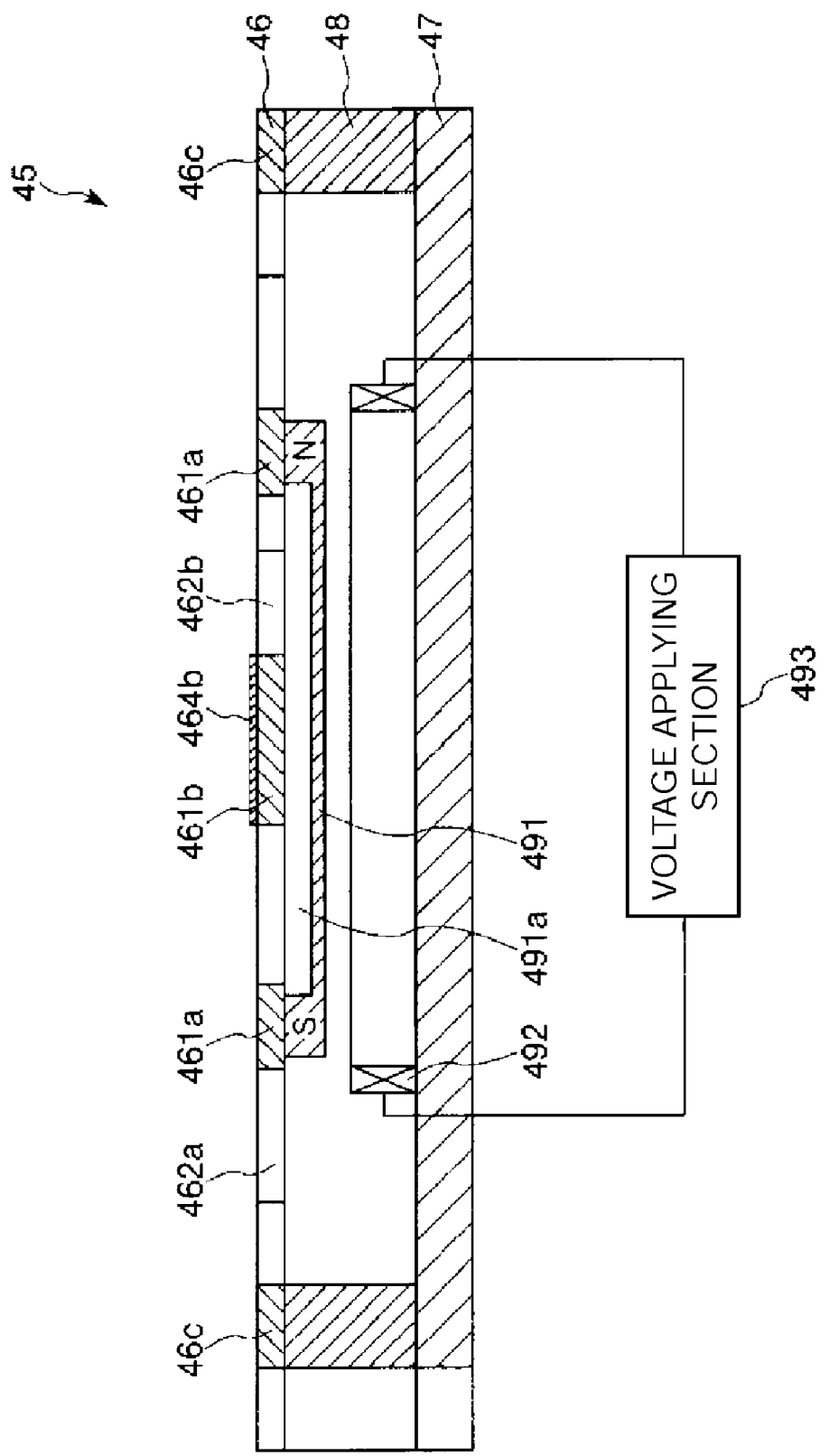
FIG. 20 is a sectional view taken along line B-B in FIG. 19.
Figure 21:
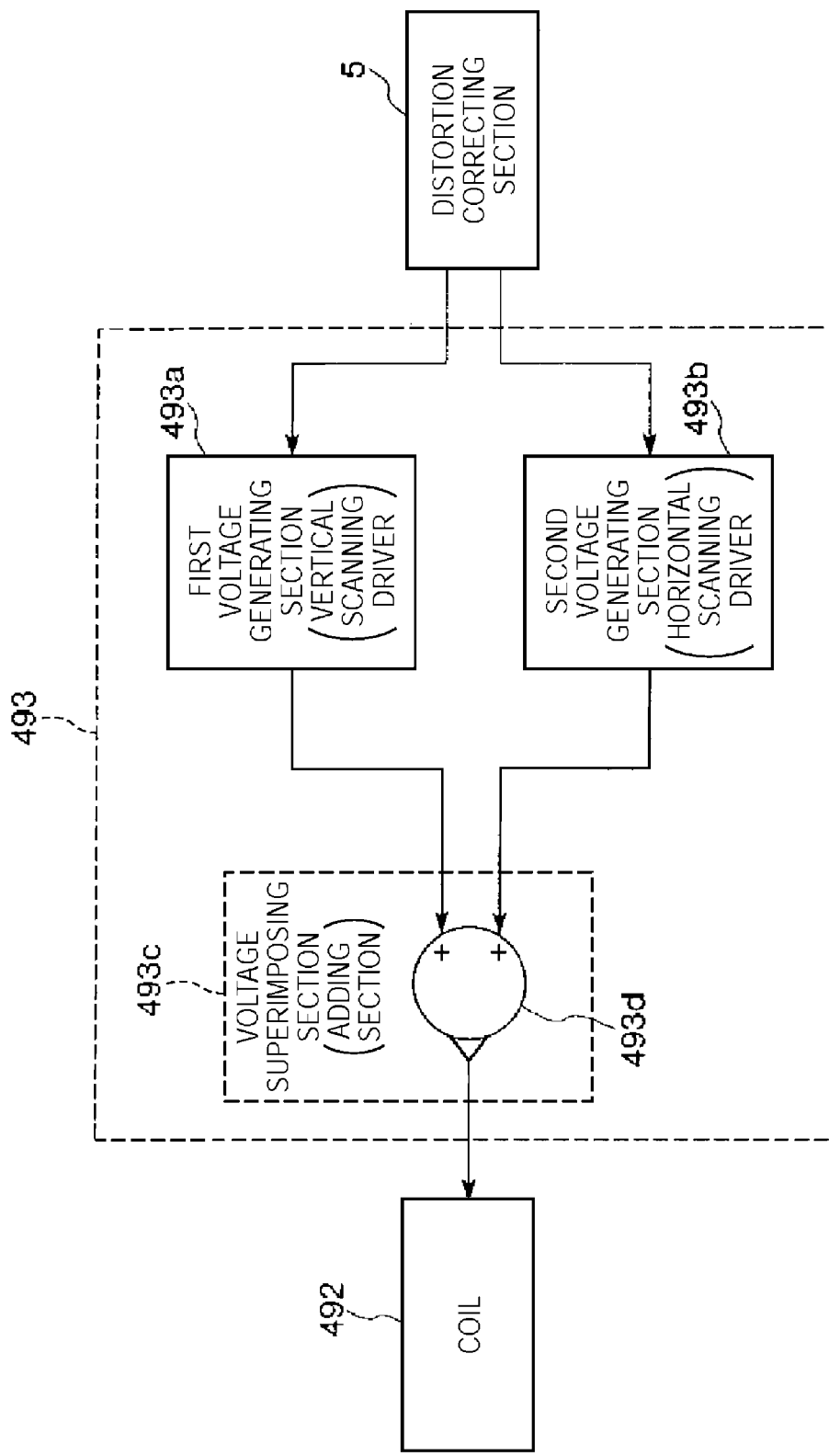
FIG. 21 is a block diagram showing a voltage applying section of a driving section included in the optical scanner shown in FIG. 19.
Figure 22A:
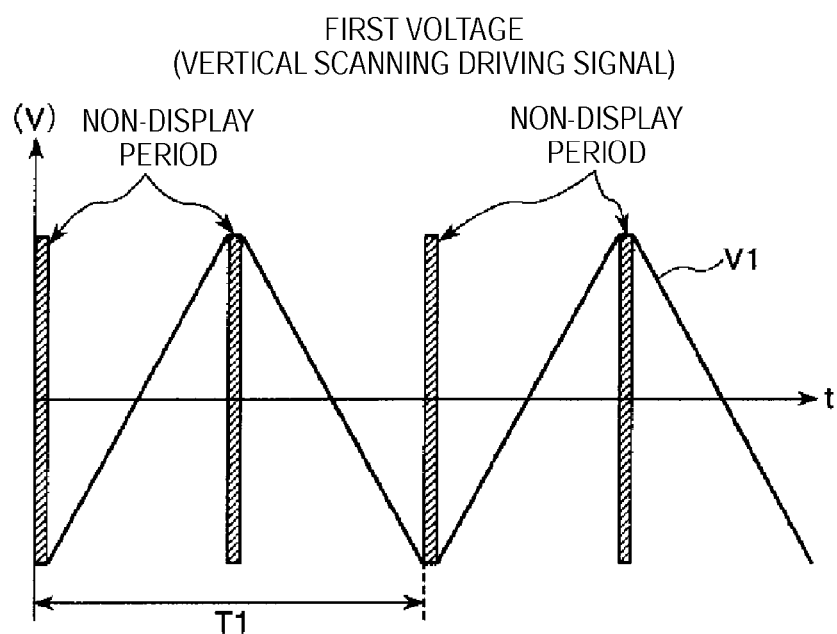
FIGS. 22A and 22B are diagrams showing an example of voltage generated by a first voltage generating section and a second voltage generating section included in the voltage applying section shown in FIG. 21.
Figure 22B:
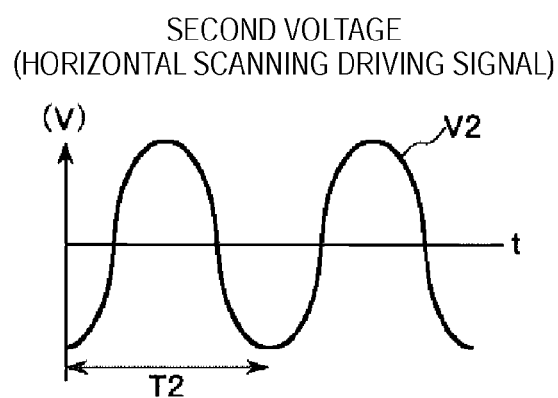
Figures 23A, 23B:
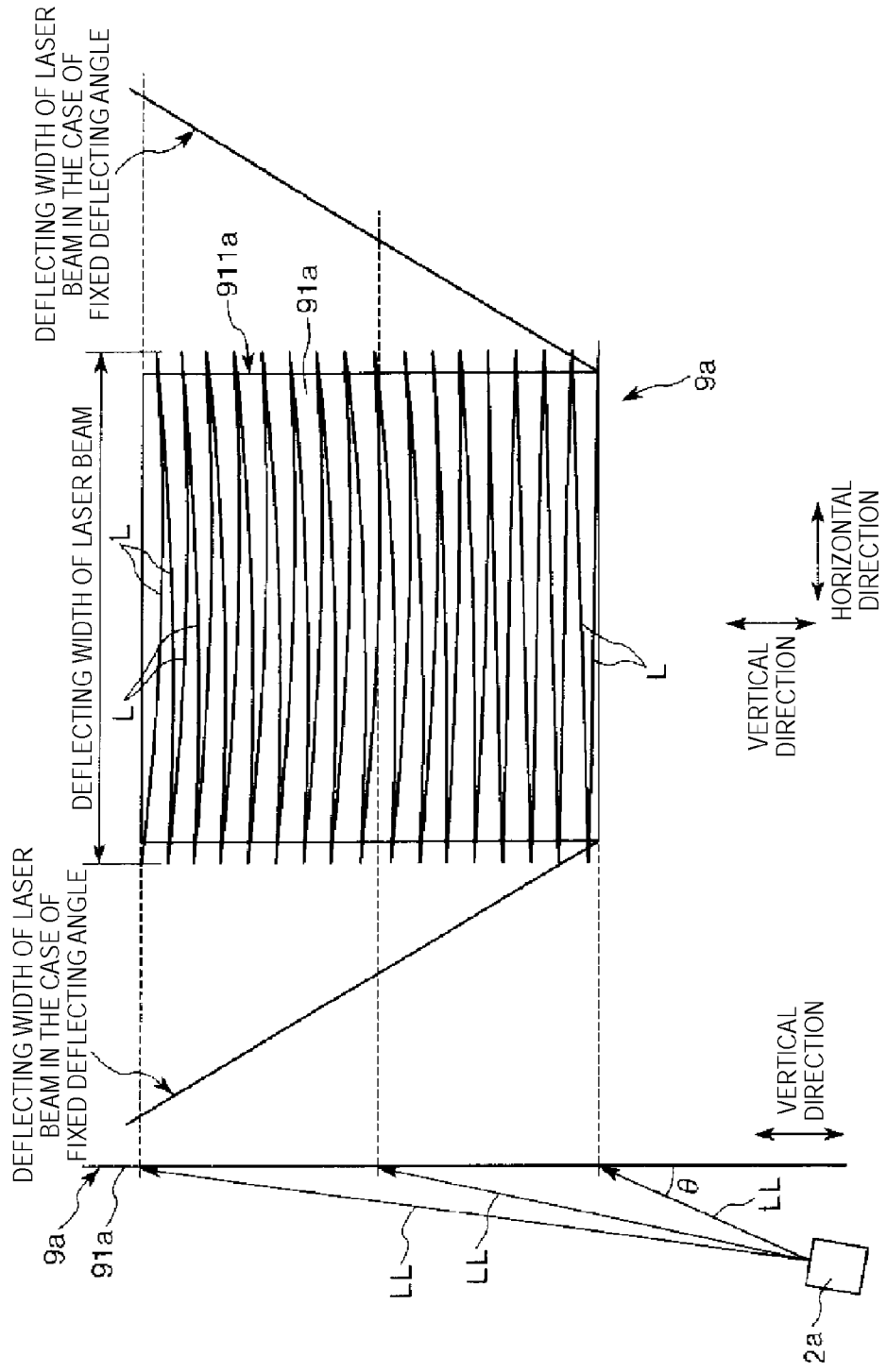
FIGS. 23A and 23B are a side view and a front view for explaining the operation of the projector included in the image forming apparatus according to the seventh embodiment of the invention.

FIG. 19 is a schematic plan view showing an optical scanner of a projector included in the image forming apparatus according to the seventh embodiment of the invention. FIG. 20 is a sectional view taken along line B-B in FIG. 19. FIG. 21 is a block diagram showing a voltage applying section of a driving section included in the optical scanner shown in FIG. 19. FIGS. 22A and 22B are diagrams showing an example of voltage generated by a first voltage generating section and a second voltage generating section included in the voltage applying section shown in FIG. 21. FIGS. 23A and 23B are a side view and a front view for explaining the operation of the projector included in the image forming apparatus according to the seventh embodiment of the invention. In the following explanation, for convenience of explanation, a front side, an inner side, a right side, and a left side in FIG. 19 are respectively referred to "upper", "lower", "right", and "left". An upper side, a lower side, a right side, and a left side in FIG. 20 are respectively referred to as "upper", "lower", "right", and "left".

In the following explanation, concerning the image forming apparatus according to the seventh embodiment, differences from the first embodiment are mainly explained. Explanation of matters same as those in the first embodiment is omitted.

The image forming apparatus according to the seventh embodiment is substantially the same as the first embodiment except that the configuration of optical scanners included in a first projector and a second projector is different and a track of scanning in a first direction (horizontal scanning) on the display surface 91*a* is not linear. In FIG. 21 and FIGS. 23A and 23B, components same as those explained in the embodiments explained above are denoted by the same reference numerals and signs.

The light scanning section 4 includes one optical scanner 45 of a so-called two degrees of freedom system (two-dimensional scanning).

The optical scanner 45 includes a substrate 46 including a first oscillating system 46*a*, a second oscillating system 46*b*, and a supporting section 46*c* shown in FIG. 19, a counter substrate 47 arranged to be opposed to the substrate 46, a spacer member 48 provided between the substrate 46 and the counter substrate 47, a permanent magnet 491, and a coil 492.

The first oscillating system 46*a* includes a frame-like driving section 461*a* provided on the inner side of the frame-like supporting section 46*c* and a pair of first coupling sections 462*a* and 463*a* that support the driving section 461*a* in the center on the supporting section 46*c*.

The second oscillating system 46*b* includes a movable plate 461*b* provided on the inner side of the driving section 461*a* and a pair of second coupling sections 462*b* and 463*b* that support the movable plate 461*b* in the center on the driving section 461*a*.

The driving section 461*a* is formed in an annular shape in plan view in FIG. 19. The shape of the driving section 461*a* is not specifically limited as long as the driving section 461*a* is formed in a frame shape. For example, the driving section 461*a* may be formed in a square annular shape in the plan view in FIG. 19. A permanent magnet 491 is joined to the lower surface of such a driving section 461*a*.

Each of the first coupling sections 462*a* and 463*a* is formed in a longitudinal shape and can be elastically deformable. Each of the first coupling sections 462*a* and 463*a* couples the driving section 461*a* and the supporting section 46*c* to make the driving section 461*a* pivotable with respect to the supporting section 46*c*. Such first coupling sections 462*a* and 463*a* are coaxially provided each other. The driving section 461*a* pivots with respect to the supporting section 46*c* around this axis (hereinafter referred to as "pivot center axis J3").

A piezoelectric element 465*a* for detecting an angle of the driving section 461*a* (a pivoting angle around the pivot center axis J3) (behavior) is provided in the first coupling section 462*a*.

The movable plate 461*b* is formed in a circular shape in the plan view in FIG. 19. The shape of the movable plate 461*b* is not specifically limited as long as the movable plate 461*b* can be formed on the inner side of the driving section 461*a*. For example, the movable plate 461*b* may be formed in an elliptical shape or may be formed in a square shape in the plan view in FIG. 19. A light reflecting section 464*b* having light reflectivity is formed on the upper surface of such a movable plate 461*b*.

Each of the second coupling sections 462*b* and 463*b* is formed in a longitudinal shape and can be elastically deformable. Each of the second coupling sections 462*b* and 463*b* couples the movable plate 461*b* and the driving section 461*a* to make the movable plate 461*b* pivotable with respect to the driving section 461*a*. Such second coupling sections 462*b* and 463*b* are coaxially provided each other. The movable plate 461b pivots with respect to the driving section 461a around this axis (hereinafter referred to as "pivot center axis J4").

A piezoelectric element 465b for detecting an angle of the movable plate 461b (a pivoting angle around the pivot center axis J4) (behavior) is provided in the second coupling section 462b.

As shown in FIG. 19, the pivot center axis J3 and the pivot center axis J4 are orthogonal to each other. Each of the center of the driving section 461a and the center of the movable plate 461b is located on an intersection of the pivot center axis J3 and the pivot center axis J4 in the plan view in FIG. 19. In the following explanation, for convenience of explanation, the intersection of the pivot center axis J3 and the pivot center axis J4 is also referred to as "intersection G".

As shown in FIG. 20, the substrate 46 explained above is joined to the counter substrate 47 via the spacer member 48. The coil 492 that generates a magnetic field acting on the permanent magnet 491 is provided on the upper surface of the counter substrate 47.

The permanent magnet 491 is provided along a segment (also referred to as "segment M") passing through the intersection G and inclined with respect to each of the pivot center axis J3 and the pivot center axis J4 in the plan view in FIG. 19. In such a permanent magnet 491, one side in a longitudinal direction with respect to the intersection G is an S pole and the other side is an N pole. In FIG. 20, the left side in the longitudinal direction of the permanent magnet 491 is the S pole and the right side is the N pole.

In the plan view in FIG. 19, an inclination angle θ of the segment M with respect to the pivot center axis J3 is desirably 30 to 60 degrees, more desirably 40 to 50 degrees, and still more desirably about 45 degrees. Since the permanent magnet 491 is provided in this way, it is possible to smoothly pivot the movable plate 461b around each of the pivot center axis J3 and the pivot center axis J4. In this embodiment, the segment M inclines about 45 degrees with respect to each of the pivot center axis J3 and the pivot center axis J4.

As shown in FIG. 20, a recessed section 491a is formed on the upper surface of the permanent magnet 491. The recessed section 491a is a clearance section for preventing contact of the permanent magnet 491 and the movable plate 461b. Since such a recessed section 491a is formed, when the movable plate 461b pivots around the pivot center axis J3, it is possible to prevent the movable plate 461b from coming into contact with the permanent meant 491.

The coil 492 is formed to surround the outer periphery of the driving section 461a in the plan view in FIG. 19. This makes it possible to surely prevent contact of the driving section 461a and the coil 492 when the optical scanner 45 is driven. As a result, it is possible to set the clearance between the coil 492 and the permanent magnet 491 relatively short and cause the magnetic field generated from the coil 492 to efficiently act on the permanent magnet 491.

The coil 492 is electrically connected to the voltage applying section 493. When voltage is applied to the coil 492 by the voltage applying section 493, the coil 492 generates a magnetic field in an axis direction orthogonal to each of the pivot center axis J3 and the pivot center axis J4.

As shown in FIG. 21, the voltage applying section 493 includes a first voltage generating section 493a that generates first voltage V1 for pivoting the movable plate 461b around the pivot center axis J3, a second voltage generating section 493b that generates second voltage V2 for pivoting the movable plate 461b around the pivot center axis J4, and a voltage superimposing section 493c that superimposes the first voltage V1 and the second voltage V2 and applies superimposed voltage to the coil 492.

In the same manner as shown in FIG. 9 in the first embodiment, as shown in FIG. 22A, the first voltage generating section 493a generates the first voltage V1 (voltage for vertical scanning) that periodically changes at a period T1 twice as large as a frame frequency.

The first voltage V1 has a waveform like a triangular wave. Therefore, the optical scanner 45 can effectively scan (subscan) light in a vertical reciprocating manner. The waveform of the first voltage V1 is not limited to this. A frequency (1/T1) of the first voltage V1 is not specifically limited as long as the frequency is a frequency suitable for the vertical scanning. However, the frequency is desirably 15 to 40 Hz (about 30 Hz).

In this embodiment, the frequency of the first voltage V1 is adjusted to be a frequency different from a torsional resonant frequency of the first oscillating system 46a including the driving section 461a and the pair of first coupling sections 462a and 463a.

On the other hand, as shown in FIG. 22B, the second voltage generating section 493b generates the second voltage V2 (voltage for horizontal scanning) that periodically changes at a period T2 different from the period T1.

The second voltage V2 has a waveform like a sine wave. Therefore, the optical scanner 45 can effectively main-scans light. The waveform of the second voltage V2 is not limited to this.

The frequency of the second voltage V2 is not specifically limited as long as the frequency is higher than the frequency of the first voltage V1 and suitable for the horizontal scanning. However, the frequency is desirable 10 to 40 kHz. Since the frequency of the second voltage V2 is set to 10 to 40 kHz in this way and the frequency of the first voltage V1 is set to about 30 Hz as explained above, it is possible to pivot the movable plate 461b around each of the pivot center axis J3 and the pivot center axis J4 at a frequency suitable for rendering on the screens. However, for example, a combination of the frequency of the first voltage V1 and the frequency of the second voltage V2 is not specifically limited as long as the movable plate 461b can be pivoted around each of the pivot center axis J3 and the pivot center axis J4.

In this embodiment, the frequency of the second voltage V2 is adjusted to be equal to a torsional resonant frequency of the second oscillating system 46b including the movable plate 461b and the pair of second coupling sections 462b and 463b. This makes it possible to increase a pivoting angle around the pivot center axis J3 of the movable plate 461b.

When a resonant frequency of the first oscillating system 46a is represented as f1 [Hz] and a resonant frequency of the second oscillating system 46b is represented as f2 [Hz], f1 and f2 desirably satisfy a relation f2>f1 and more desirably satisfy a condition f2≦10 f1. This makes it possible to more smoothly pivot the movable plate 461b around the pivot center axis J4 at the frequency of the second voltage V2 while pivoting the movable plate 461b around the pivot center axis J3 at the frequency of the first voltage V1.

Each of the first voltage generating section 493a and the second voltage generating section 493b is connected to the distortion correcting section 5 and driven on the basis of a signal from the distortion correcting section 5. The voltage superimposing section 493c is connected to the first voltage generating section 493a and the second voltage generating section 493b.

The voltage superimposing section 493c includes an adder 493d for applying voltage to the coil 492. The adder 493d receives the first voltage V1 from the first voltage generating section 493a, receives the second voltage V2 from the second voltage generating section 493b, superimposes the voltages, and apply superimposed voltage to the coil 492.

The optical scanner 45 having the configuration explained above is driven as explained below.

For example, the voltage superimposing section 493c superimposes the first voltage V1 shown in FIG. 22A and the second voltage V2 shown in FIG. 22B and applies superimposed voltage to the coil 492 (the superimposed voltage is also referred to as "voltage V3").

Then, a magnetic field for attracting the S pole side of the permanent magnet 491 to the coil 492 and separating the N pole side from the coil 492 and a magnetic field for separating the S pole side of the permanent magnet 491 from the coil 492 and attracting the N pole side to the coil 492 are alternately switched by voltage corresponding to the first voltage V1 in the voltage V3. Consequently, the driving section 461a pivots around the pivot center axis J3 at the frequency of the first voltage V1 together with the movable plate 461b while torsionally deforming the first coupling sections 462a and 463a.

The frequency of the first voltage V1 is set extremely low compared with the frequency of the second voltage V2. The resonant frequency of the first oscillating system 46a is designed lower than the resonant frequency of the second oscillating system 46b. Therefore, the first oscillating system 46a more easily oscillates than the second oscillating system 46b. It is possible to prevent the movable plate 461b from pivoting around the pivot center axis J4 with the first voltage V1.

On the other, a magnetic field for attracting the S pole side of the permanent magnet 491 to the coil 492 and separating the N pole side from the coil 492 and a magnetic field for separating the S pole side of the permanent magnet 491 from the coil 492 and attracting the N pole side to the coil 492 are alternately switched by voltage corresponding to the second voltage V2 in the voltage V3. Consequently, the movable plate 461b pivots around the pivot center axis J4 at the frequency of the second voltage V2 while torsionally deforming the second coupling sections 462b and 463b.

Since the frequency of the second voltage V2 is equal to the torsional resonant frequency of the second oscillating system 46b, it is possible to dominantly pivot the movable plate 461b around the pivot center axis J4 with the second voltage V2. Therefore, it is possible to prevent the movable plate 461b from pivoting around the pivot center axis J3 together with the driving section 461a with the second voltage V2.

With the optical scanner 45 explained above, it is possible to two-dimensionally scan a laser beam (light) with one actuator and realize space saving for the light scanning section 4. For example, when a pair of optical scanners are used as in the first embodiment, a relative positional relation between the optical scanners has to be highly accurately set. However, since this is unnecessary in this embodiment, it is possible to realize easiness of manufacturing.

In this embodiment, unlike FIGS. 7A and 7B in the first embodiment, when the laser beam (light) LL is two-dimensionally scanned on the display surface 91a in the light emission state in which the laser beam LL is emitted from the light source unit 3 as shown in FIGS. 23A and 23B, plural rendering lines (scanning lines) 6 as tracks of the laser beam LL on the display surface 91a are arranged in a zigzag and distorted state.

Since the scanning lines are distorted, the video-data calculating section 52 reads out, while calculating data equivalent to pixel data that should be rendered on aline to be scanned, the data from the video-data storing section and, after performing various kinds of correction calculation and the like based on the rendering timing information input from the rendering-timing generating section 53, sends luminance data of the colors to the light-source modulating section 54.

Concerning processing other than the above, processing same as that in the first embodiment is performed.

According to the seventh embodiment, is it possible to realize effects same as those in the first embodiment.

Eighth Embodiment

An eighth embodiment of the image forming apparatus according to the invention is explained below.

Figure 24:
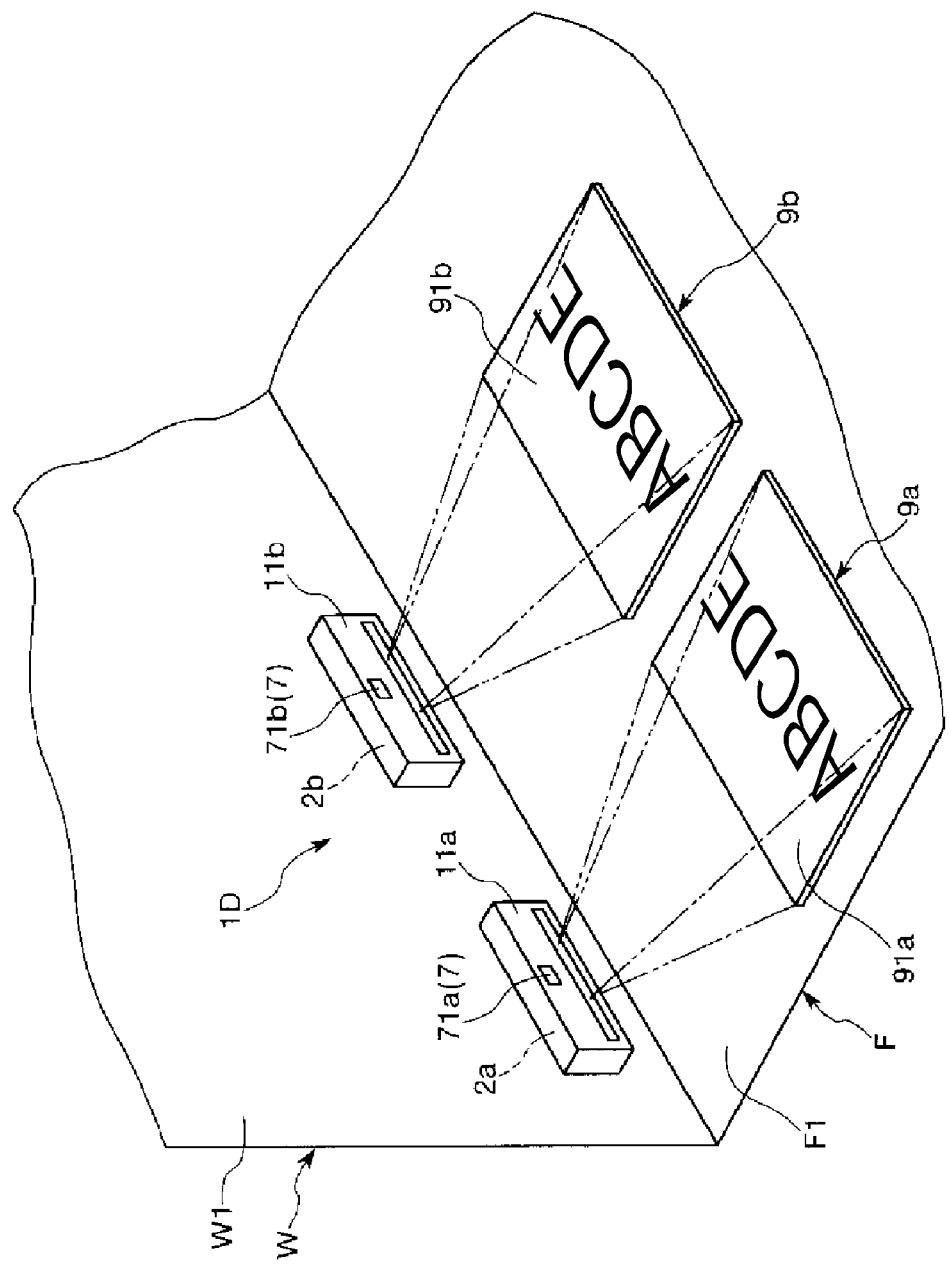
FIG. 24 is a diagram showing an eighth embodiment of the image forming apparatus according to the invention.

FIG. 24 is a diagram showing the eighth embodiment of the image forming apparatus according to the invention.

In the following explanation, concerning the image forming apparatus according to the eighth embodiment, differences from the embodiments explained above are mainly explained. Explanation of matters same as those in the embodiments is omitted.

The image forming apparatus according to the eighth embodiment is substantially the same as the image forming apparatus according to the first embodiment except that two projectors are provided in separate housings and sensor sections of human sensors are provided in the respective housings. In FIG. 24, components same as those in the embodiments explained above are denoted by the same reference numerals and signs.

As shown in FIG. 24, an image forming apparatus 1D according to this embodiment includes two housings 11a and 11b. The projector 2a is housed in one housing 11a and the projector 2b is housed in the other housing 11b.

This makes it possible to set a setting position of the housing 11a and a setting position of the housing 11b in desired positions, respectively. For example, when the clearance between the display surface 91a and the display surface 91b is large, it is possible to display high-quality images without distortion on the display surface 91a and the display surface 91b, respectively. Even when there is an obstacle or the like between the display surface 91a and the display surface 91b, it is possible to display images on the display surface 91a and the display surface 91b, respectively.

A sensor section 71a is provided in the housing 11a and a sensor section 71b is provided in the housing 11b.

The sensor section 71a is a sensor section for detecting presence or absence of a person in the first detection region S1 of the sensor section 71 in the first embodiment. On the other hand, the sensor section 71b is a sensor section for detecting presence or absence of a person in the second detection region S2 of the sensor section 71 in the first embodiment.

Since the two sensor sections 71a and 71b are provided in the separate housings corresponding to the projectors 2a and 2b, it is possible to accurately and surely detect presence or absence of a person in each of the first detection region S1 and the second detection region S2.

Detection information of the two sensors 71a and 71b are sent to a not-shown determining section by wire or radio. In the same manner as the determination for the human sensor 7 in the first embodiment, the determining section determines presence or absence of a person in each of the first detection region S1 and the second detection region S2. At least two states among the first state, the second state, the third state, and the fourth state are switched on the basis of a result of the determination. The determining section and the like only have to be provided in the housing 11a or the housing 11b.

According to the eighth embodiment, it is possible to realize effects same as those in the first embodiment.

Ninth Embodiment

A ninth embodiment of the image forming apparatus according to the invention is explained below.

Figure 25:
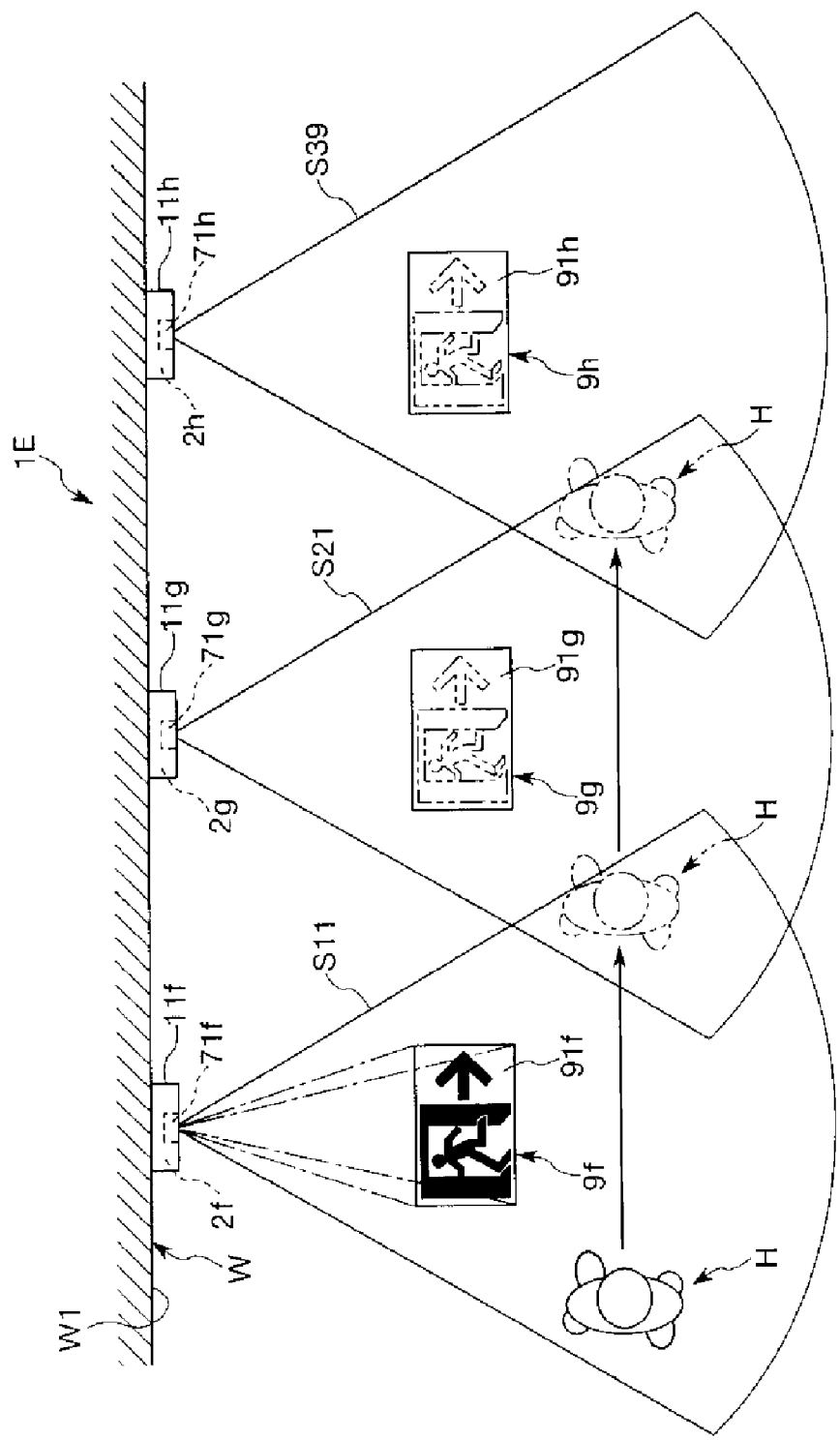
FIG. 25 is a diagram showing a ninth embodiment of the image forming apparatus according to the invention.

FIG. 25 is a diagram showing the ninth embodiment of the image forming apparatus according to the invention.

In the following explanation, concerning the image forming apparatus according to the ninth embodiment, differences from the embodiments explained above are mainly explained. Explanation of matters same as those in the embodiments is omitted.

The image forming apparatus according to the ninth embodiment is substantially the same as the image forming apparatus according to the first embodiment except that three projectors are provided in separate housings and sensor sections of human sensors are provided in the respective housings. In FIG. 25, components same as those in the embodiments explained above are denoted by the same reference numerals and signs.

As shown in FIG. 25, an image forming apparatus 1E according to this embodiment includes three housings 11f, 11g, and 11h. A projector 2f that displays an image on a display surface 91f of a screen 9f is housed in the housing 11f. A projector 2g that displays an image on a display surface 91g of a screen 9g is housed in the housing 11g. A projector 2h that displays an image on a display surface 91h of a screen 9h is housed in the housing 11h.

The housings 11f, 11g, and 11h are set side by side a predetermined space apart from one another, for example, along a passage in a building. The screens 9f, 9g, and 9h are set side by side a predetermined space apart from one another along a direction in which the housings 11f, 11g, and 11h are arranged.

A sensor section 71f is provided in the housing 11f, a sensor section 71g is provided in the housing 11g, and a sensor section 71h is provided in the housing 11h.

The sensor section 71f is a sensor section for detecting presence or absence of a person (a moving object) present in a detection region (a first detection region) S11. The detection region S11 is set to include the screen 9f and not to include the screens 9g and 9h when viewed from above in the vertical direction.

The sensor section 71g is a sensor section for detecting presence or absence of a person (a moving object) present in a detection region (a second detection region) S21. The detection region S21 is set to include the screen 9g and not to include the screens 9f and 9h when viewed from above in the vertical direction.

The sensor section 71h is a sensor section for detecting presence or absence of a person (a moving object) present in a detection region (a third detection region) S31. The detection region S31 is set to include the screen 9h and not to include the screens 9f and 9g when viewed from above in the vertical direction.

Presence or absence of a person in the detection regions S11, S21, and S31 is detected in this way. A first state in which an image is displayed on the screen 9f, a second state in which an image is displayed on the screen 9g, and a third state in which an image is displayed on the screen 9h are selectively switched on the basis of a result of the detection.

Specifically, when a person is present in the detection region S11, the projector 2f displays an image on the screen 9f. When a person is present in the detection region S21, the projector 2g displays an image on the screen 9g. When a person is present in the detection region S31, the projector 2h displays an image on the screen 9h.

For example, as shown in FIG. 25, when the person H moves from the right side to the left side in the figure, images are displayed in order on the screen 9f, the screen 9g, and the screen 9h to follow the movement of the person H on the basis of presence or absence of a person in the detection regions S11, S21, and S31.

Since the switching of a display position of an image is performed by using the three projectors 2f, 2g, and 2h, it is possible to improve expression power by the image. Therefore, for example, in this embodiment, it is possible to attract people's attention to the image for a long period or a long distance in a long passage. As a result, as shown in FIG. 25, when an image showing an emergency exit is used, it is possible to appropriately and surely guide a person to a desired place (e.g., the emergency exit).

According to the ninth embodiment, it is possible to realize effects same as those in the first embodiment.

Tenth Embodiment

A tenth embodiment of the image forming apparatus according to the invention is explained below.

Figure 26:
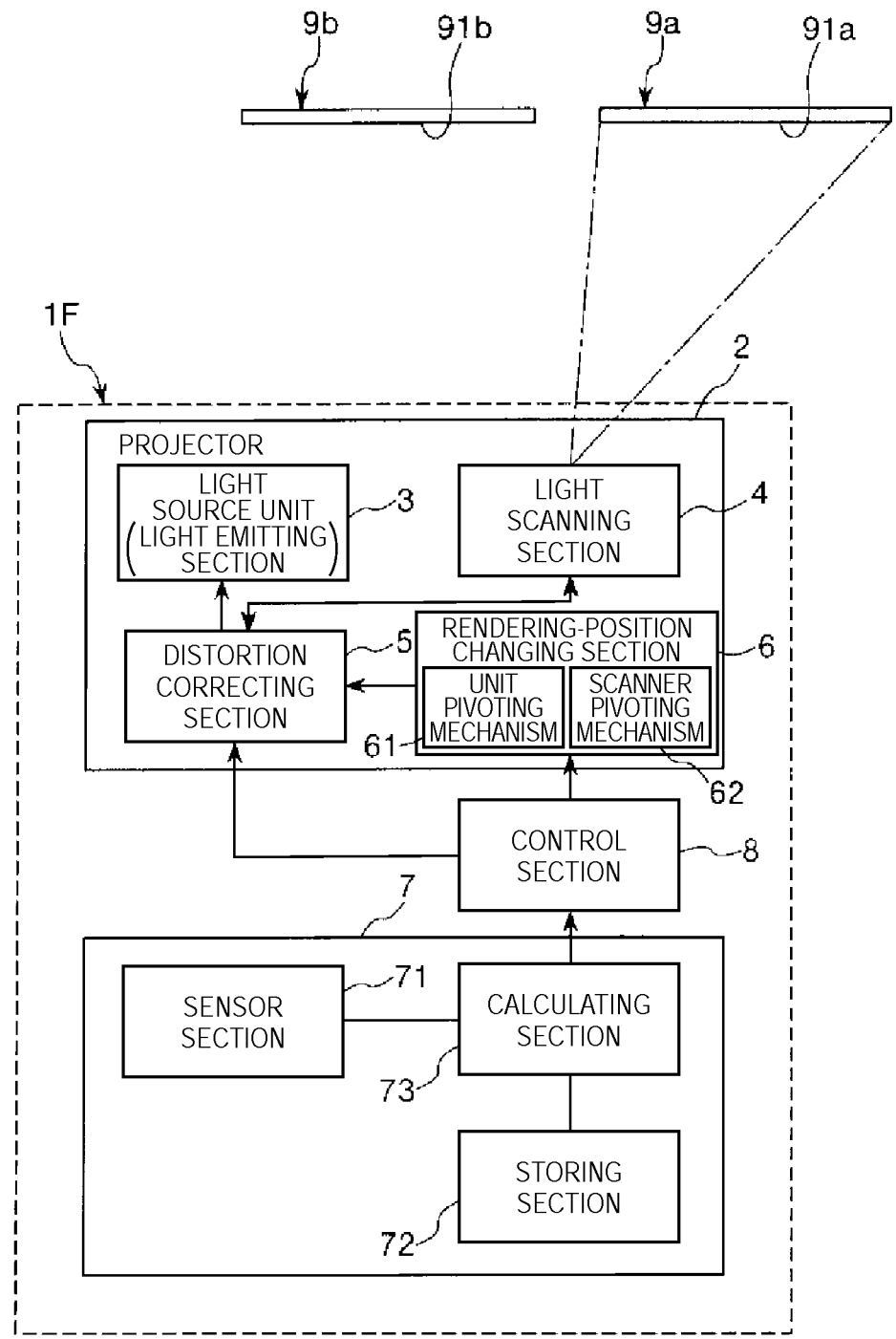
FIG. 26 is a block diagram showing a schematic configuration of an image forming apparatus according to a tenth embodiment of the invention.
Figure 27:
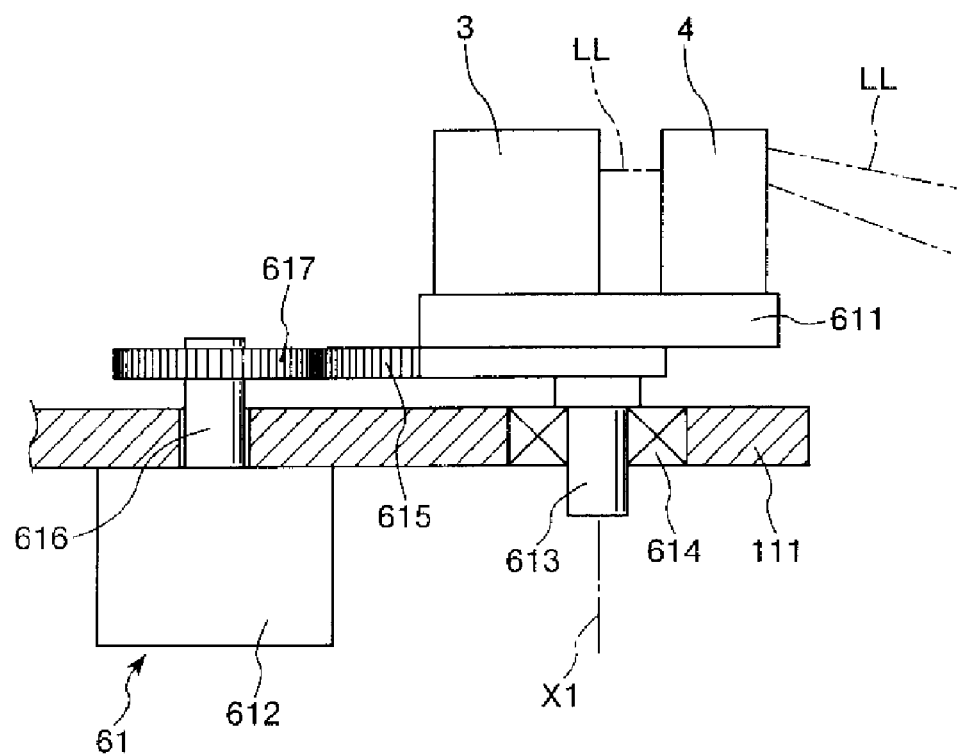
FIG. 27 is a partial sectional side view showing a unit pivoting mechanism of a rendering-position changing section included in a projector shown in FIG. 26.
Figure 29:
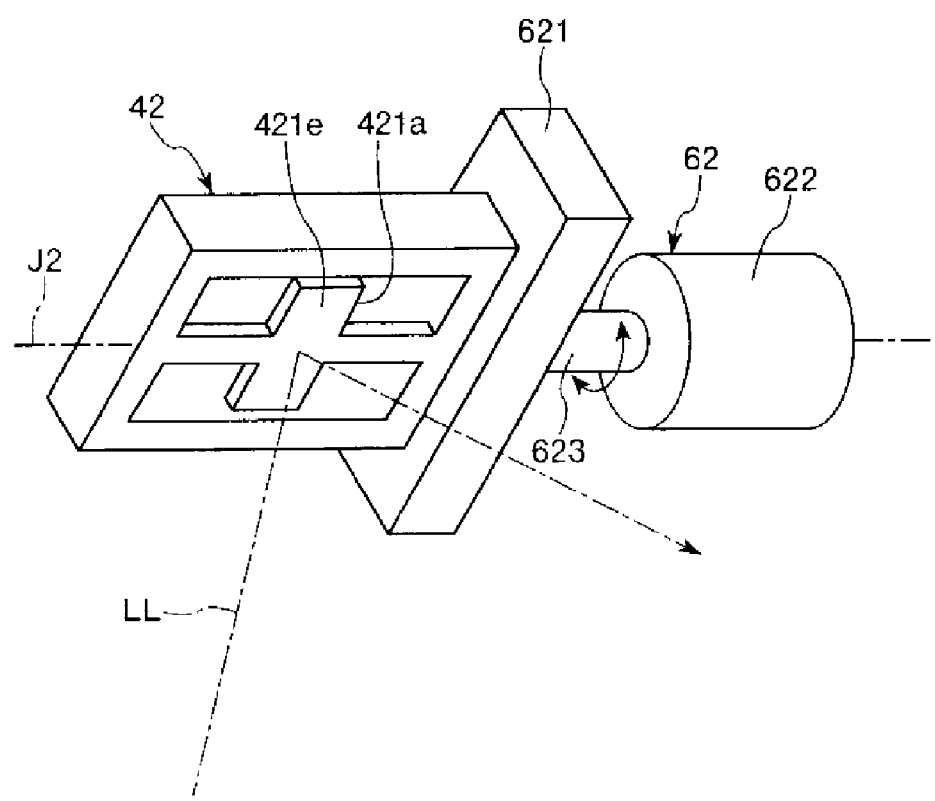
FIG. 29 is a perspective view showing a scanner pivoting mechanism of the rendering-position changing section included in the projector shown in FIG. 26.

FIG. 26 is a block diagram showing a schematic configuration of an image forming apparatus according to a tenth embodiment of the invention. FIG. 27 is a partial sectional side view showing a unit pivoting mechanism of a rendering-position changing section included in a projector shown in FIG. 26. FIGS. 28A and 28B are top views for explaining an action of the unit pivoting mechanism shown in FIG. 27. FIG. 29 is a perspective view showing a scanner pivoting mechanism of the rendering-position changing section included in the projector shown in FIG. 26.

In the following explanation, concerning the image forming apparatus according to the tenth embodiment, differences from the embodiments explained above are mainly explained. Explanation of matters same as those in the embodiments is omitted.

The image forming apparatus according to the tenth embodiment is substantially the same as the image forming apparatus according to the first embodiment except that a projector including a rendering-position changing section is used. In FIGS. 26 to 29, components same as those in the embodiments are denoted by the same reference numerals and signs.

An image forming apparatus 1F according to this embodiment includes, as shown in FIG. 26, the projector 2 that scans light on the display surfaces 91a and 91b and displays (renders) an image, the human sensor 7 that detects presence or absence of a person near the display surfaces 91a and 91b and a moving state of the person, and the control section 8 that controls driving of the projector 2 on the basis of a detection result of the human sensor 7.

The projector 2 includes the light source unit (the light emitting section) 3 that emits light, the light scanning section 4 that scans the light, which is emitted from the light source unit 3, on the display surfaces 91a and 91b, the distortion correcting section (the operation control device) 5 that controls the light source unit 3 and the light scanning section 4, and a rendering-position changing section 6 that changes a position where an image is displayed (hereinafter also simply referred to as "rendering position").

The rendering-position changing section 6 includes a unit pivoting mechanism 61 and a scanning pivoting mechanism 62.

The unit pivoting mechanism 61 has a function of pivoting the light source unit (the light emitting section) 3 and the light scanning section 4 as a unit. In this embodiment, the unit pivoting mechanism 61 pivots the light source unit (the light emitting section) 3 and the light scanning section 4 to thereby change a projection angle and move a rendering position mainly in the direction of the horizontal scanning.

The unit pivoting mechanism 61 includes, as shown in FIG. 27, a supporting section 611 that pivotably supports the light source unit 3 and the light scanning section 4 and a motor 612 that pivots the supporting section 611.

The supporting section 611 includes a shaft section 613 having an axis X1 as a center axis. The shaft section 613 is attached to an attaching section 111 of the housing 11 via a bearing 614.

This makes it possible to pivot the light source unit 3 and the light scanning section 4 around the predetermined axis X1 together with the supporting section 611. Since the light source unit 3 and the light scanning section 4 re integrally pivoted in this way, it is possible to change a rendering position without requiring adjustment of alignment of the light source unit 3 and the light scanning section 4.

In this embodiment, the predetermined axis X1 is set along the vertical direction. Specifically, the unit pivoting mechanism 61 pivots the light source unit 3 and the light scanning section 4 around an axis orthogonal the display surfaces 91a and 91b. This makes it possible to move the rendering position in the direction of the horizontal scanning while suppressing distortion due to a change of the rendering position.

A first gear 615 is provided in the supporting section 611. In the first gear 615, plural teeth arranged along the circumferential direction of the shaft section 613 (the axis X1) are provided.

On the other hand, the motor 612 includes a shaft section 616 that rotates around an axis. A second gear 617 that meshes with the first gear 615 is attached to the shaft section 616. In the second gear 617, plural teeth arranged along the circumferential direction of the shaft section 616 are provided.

The motor 612 is attached to the attaching section 111 and rotates the second gear 617.

More specifically, as shown in FIG. 28A, the motor 612 rotates the second gear 617 counterclockwise to thereby rotate the supporting section 611 around the shaft section 613 clockwise. This makes it possible to move an emitting direction of the laser beam LL to the right side in FIGS. 28A and 28B. On the other hand, as shown in FIG. 28B, the motor 612 rotates the second gear 617 clockwise to thereby rotate the supporting section 611 around the shaft section 613 counterclockwise. This makes it possible to move the emitting direction of the laser beam LL to the left side in FIG. 13.

The unit pivoting mechanism (a unit pivoting section) 61 explained above integrally pivots the light source unit 3 and the light scanning section 4. Therefore, it is possible to expand a range in which the rendering position can be changed (a range in which an image can be displayed). It is unnecessary to separately perform alignment adjustment for the light source unit 3 and the light scanning section 4 to change the rendering position. This makes it easy to design and manufacture the projector 2. The unit pivoting mechanism (the unit pivoting section) 61 does not always have to integrally pivot the light source unit 3 and the light scanning section 4 around the axis X1. The unit pivoting mechanism (the unit pivoting section) 61 may pivot the light source unit 3 and the light scanning section 4 around an axis orthogonal to the axis X1. In this case, the rendering position can be two-dimensionally moved even if a scanner pivoting mechanism 62 explained later is omitted.

On the other hand, the scanner pivoting mechanism 62 has a function of pivoting the optical scanner 42 for vertical scanning. In this embodiment, the scanner pivoting mechanism 62 pivots the optical scanner 42 to thereby move the rendering position mainly in the direction of the vertical scanning.

The scanner pivoting mechanism 62 includes, as shown in FIG. 29, a supporting section 621 that supports the optical scanner 42 for vertical scanning and a motor 622 that pivots the supporting section 621.

The motor 622 includes a shaft section 623 that rotates around an axis. The supporting section 621 is attached to the shaft section 623.

Although not shown in the figure, the motor 622 is attached (fixed) to the supporting section 611 of the unit pivoting mechanism 61.

The motor 622 pivots the optical scanner 42 around the axis of the shaft section 623 (specifically, an axis coinciding with the pivot center axis J2) together with the supporting section 621. This makes it possible to move the emitting direction of the laser beam LL in the direction of the vertical scanning.

The scanner pivoting mechanism (the scanner pivoting section) 62 explained above pivots the entire optical scanner 42 with respect to the light source unit 3. Therefore, it is possible to expand a range in which the rendering position can be changed (a range in which an image can be displayed). In particular, in this embodiment, of the optical scanners 41 and 42, the scanner pivoting mechanism 62 pivots the optical scanner 42 on the front side in a traveling direction of the laser beam LL. Therefore, it is possible to relatively easily expand the range in which the rendering position can be changed. The scanner pivoting mechanism (the scanner pivoting section) 62 does not always have to pivot the optical scanner 42 around the pivot center axis J2. The scanner pivoting mechanism (the scanner pivoting section) 62 may pivot the optical scanner 42 around an axis orthogonal to the pivot center axis J2. In this case, the unit pivoting mechanism 61 may be omitted. The scanner pivoting mechanism 62 may pivot the optical scanner 41. In this case, the range in which the rendering region can be changed is limited by an area of the light reflecting section 421e of the optical scanner 42. Therefore, to expand such a range, it is necessary to increase the area of the light reflecting section 421e.

As explained above, the rendering-position changing section 6 can two-dimensionally change the rendering position in the direction of the horizontal scanning and the direction of the vertical scanning. This makes it possible to switch a first state in which the projector 2 displays an image on the display surface 91a and a second state in which the projector 2 displays an image on the display surface 91b.

In this embodiment, rendering is performed by using a laser beam emitted from the light source unit 3. Therefore, when the rendering position is changed, it is possible to display a high-quality image even if focus adjustment is omitted or simplified.

According to the tenth embodiment, it is possible to realize effects same as those in the first embodiment.

The image forming apparatus according to the invention has been explained on the basis of the embodiments shown in the figures. However, the invention is not limited to the embodiments. The configurations of the sections can be replaced with configurations having the same functions. The invention may be a combination of arbitrary two or more configurations (characteristics) among the embodiments.

In this embodiment, as the image forming apparatus, the image forming apparatus that renders an image on the screen and the image forming apparatus that renders an image on the wall, the floor, the ceiling, and the like are explained. However, the invention is not limited to this. For example, transmitted or diffused light may be seen from the opposite side by using a light diffusion plate or the like.

The arrangement of the first and second projectors and the first and second display sections is not limited to the embodiments. For example, the projectors may be set on a first wall surface and the first and second display sections may be set on a second wall surface orthogonal to the first wall surface. The projectors may be set on a ceiling surface and the first and second display sections may be set on a wall surface. The projectors may be set on one of surfaces parallel to each other (e.g., wall surfaces or a floor surface and a ceiling surface) and the first and second display sections may be set on the other. The first projector and the second projector may be set on surfaces different from each other (e.g., two wall surfaces orthogonal to each other).

In the examples explained in the embodiments, the two or three projectors are used. However, images may be displayed on display sections in different positions by using four or more projectors.

In the first embodiment, the pair of optical scanners are used as the light scanning section. However, the invention is not limited to this. For example, an optical scanner and a galvanometer mirror may be used. In this case, the galvanometer mirror is desirably used for the vertical scanning.

In this embodiment, the first direction is the "horizontal direction" and the second direction is the "vertical direction". However, the invention is not limited to this. For example, the first direction may be the "vertical direction" and the second direction may be the "horizontal direction".

In this embodiment, the red laser beam, the green laser beam, and the blue laser beam are combined and one laser beam (light) is emitted by using the three dichroic mirrors. However, the laser beams may be combined by using dichroic prisms or the like.

In the configurations explained in the embodiments, the light source unit 3 includes the laser beam source that emits a red laser, the laser beam source that emits a blue laser, and the laser beam source that emits a green laser. However, the invention is not limited to this. For example, the light source unit 3 may include the laser beam source that emits a red laser, the laser beam source that emits a blue laser, and a laser beam source that emits an ultraviolet laser. In this case, a phosphor that generates green fluorescent light when the ultraviolet laser is irradiated thereon is included in a screen. This makes it possible to display a full color image on a display surface.

The entire disclosure of Japanese Patent Application No.: 2009-263406, filed Nov. 18, 2009 and 2010-097166, filed Apr. 20, 2010 are expressly incorporated by reference herein.

What is claimed is:

1. An image forming apparatus comprising:
    a first projector that scans light on a first display section to thereby display an image;
    a second projector that scans the light on a second display section, which is in a position different from a position of the first display section, to thereby display an image;
    a switching section that switches plural states including a first state in which the first projector displays the image on the first display section and a second state in which the second projector displays an image on the second display section; and
    a moving object detection sensor that detects whether a moving object is present in each of a first detection region and a second detection region in a position different from a position of the first detection region, wherein
    the switching section switches the first state and the second state on the basis of a detection result of the moving object detection sensor.

2. The image forming apparatus according to claim 1, wherein each of the first projector and the second projector includes:
    a light emitting section that emits a laser beam; and
    a light scanning section including an optical scanner in which a movable plate including a light reflecting section for reflecting the laser beam emitted from the light emitting section is pivotably provided, the optical scanner scanning the light reflected by the light reflecting section according to the pivoting.

3. The image forming apparatus according to claim 1, wherein the switching section switches the image forming apparatus to the first state when the moving object detection sensor detects presence of a moving object in the first detection region and switches the image forming apparatus to the second state when the moving object detection sensor detects presence of a moving object in the second detection region.

4. The image forming apparatus according to claim 1, wherein the switching section switches plural states including a third state in which the first projector displays an image on the first display section and the second projector displays an image on the second display section.

5. The image forming apparatus according to claim 1, further comprising a third projector that scans light on a third display section, which is in a position different from the positions of the first display section and the second display section, to thereby display an image, wherein
    the switching section switches plural states including a state in which the third projector displays an image in the third display section.

6. An image forming apparatus comprising:
    a projector that scans light to thereby display an image;
    a switching section that switches plural states including a first state in which the projector displays an image on a first display section and a second state in which the projector displays an image on a second display section in a position different from the position of the first display section; and
    a moving object detection sensor that detects whether a moving object is present in each of a first detection region and a second detection region in a position different from a position of the first detection region, wherein
    the switching section switches the first state and the second state on the basis of a detection result of the moving object detection sensor.

7. The image forming apparatus according to claim 6, wherein the projector includes a light emitting section that emits a laser beam, the projector scanning the laser beam emitted from the light emitting section to thereby display an image.

* * * * *